United States Patent
Dunkle

(10) Patent No.: US 6,288,717 B1
(45) Date of Patent: Sep. 11, 2001

(54) HEADLINE POSTING ALGORITHM

(76) Inventor: Terry Dunkle, 7 Kilian Dr., Danbury, CT (US) 06811

( * ) Notice: Subject to any disclaimer, the term of this patent is extended or adjusted under 35 U.S.C. 154(b) by 0 days.

(21) Appl. No.: 09/272,415

(22) Filed: Mar. 19, 1999

(51) Int. Cl.[7] .................................................. G06F 13/00
(52) U.S. Cl. ............................................. 345/334; 345/337
(58) Field of Search .................................... 345/334, 356, 345/357, 320, 327, 333, 340–346, 348, 349, 337, 355; 707/10; 705/79, 10, 1

(56) References Cited

U.S. PATENT DOCUMENTS

| | | | | |
|---|---|---|---|---|
| 5,848,396 | * | 12/1998 | Gerge | 705/10 |
| 5,974,572 | * | 10/1999 | Weinberg et al. | 714/47 |
| 5,991,735 | * | 11/1999 | Gerale | 705/10 |
| 6,003,032 | * | 12/1999 | Bunney et al. | 707/10 |
| 6,144,962 | * | 11/2000 | Weinberg et al. | 707/10 |
| 6,161,660 | * | 5/2000 | Eggleston et al. | 705/14 |
| 6,178,409 | * | 1/2001 | Weber et al. | 705/79 |
| 6,199,753 | * | 3/2001 | Tracy et al. | 235/375 |
| 6,205,472 | * | 3/2001 | Gilmour | 709/206 |

OTHER PUBLICATIONS

Dinucci et al., *Elements of Web Design, 2nd Edn.*, Peachpit Press, Berkeley, Ca. pp. 55–67, 83–103, 181–201, 1998.*

* cited by examiner

*Primary Examiner*—Steven Sax
(74) *Attorney, Agent, or Firm*—Levisohn, Lerner, Berger & Langsam

(57) ABSTRACT

The program uses the topic interest flags to determine which articles and other customizable elements of the database are shown on a particular member's home page. The headline posting algorithm first checks the flags on every available item against the member's interests, recorded in his or her user profile, then weighs the importance, rarity and significance of each match it has found, and finally displays the three highest-scoring items on the member's home page in descending order of value.

25 Claims, 45 Drawing Sheets

HEALTHSCOUT REGISTRATION - NETSCAPE

FILE EDIT VIEW GO COMMUNICATOR HELP

BACK FORWARD RELOAD HOME SEARCH GUIDE PRINT SECURITY STOP

BOOKMARKS NETSITE: .HEALTH.COM/CGI-BIN/WEBOBJECTS/REG.WOA/2/WO/BB2000VN6000S400/5.1.6.1.4

INSTANT MESSAGE INTERNET LOOKUP NEW&COOL

DISEASES & CONDITIONS
- ☐ ALCOHOL ABUSE
- ALLERGIES
  - ANAPHYLACTIC SHOCK
    - ☐ ALLERGIES: FOOD
      - ☐ LACTOSE INTOLERANCE
    - ☐ FOOD
    - ☐ NASEL
    - ☐ ALLERGIES: MISC.
- ☑ ALZHEINER'S
- ARTHRITIS
  - ☐ DEMOGRAPHICS
  - ☐ DIET
  - ☐ DRUGS
  - ☐ MANAGEMENT
  - ☐ OSTEO

DOCUMENT: DONE

FIG. 9

HEALTHSCOUT REGISTRATION - NETSCAPE

FILE  EDIT  VIEW  GO  COMMUNICATOR  HELP

BACK  FORWARD  RELOAD  HOME  SEARCH  GUIDE  PRINT  SECURITY  STOP

BOOKMARKS  NETSITE: .HEALTH.COM/CGI-BIN/WEBOBJECTS/REG.WOA/2/WO/BB2OOOVN6OOOS4OO/7.1.6.1.4

INSTANT MESSAGE  INTERNET  LOOKUP  NEW&COOL

HEALTH BIZ
  DEVICES/TECHNOLOGIES
    ☐ BIOTECHNOLOGY
    ☐ BLOOD GLUCOSE MONITORS
    ☐ CONDOMS
    ☐ EYE DROPS
    ☐ FEMININE PRODUCTS
    ☑ FITNESS EQUIPMENT
    ☐ IMAGING DEVICES
    ☐ LASERS/LASER SURGERY
    ☐ PEAK-FLOW METERS
  PROSTHESES
    ☐ ARTIFICIAL HIPS
    ☐ ARTIFICIAL KNEES
    ☑ DENTURES
    ☑ HEARING AIDS

DOCUMENT: DONE

```
HEALTHSCOUT REGISTRATION - NETSCAPE
FILE  EDIT  VIEW  GO  COMMUNICATOR  HELP
BACK  FORWARD  RELOAD  HOME  SEARCH  GUIDE  PRINT  SECURITY  STOP
BOOKMARKS  NETSITE: .HEALTH.COM/CGI-BIN/WEBOBJECTS/REG.WOA/2/WO/BB2000VN6000S400/13.1.6.1.4
INSTANT MESSAGE  INTERNET  LOOKUP  NEW&COOL

SAFETY & PUBLIC HEALTH
  ☑ DRUNK DRIVING/RIDING
  EMERGENCIES
         ☐ ANAPHYLACTIC SHOCK
         ☐ ANEURYSM
         ☐ APPENDICITIS
         ☑ BITES & STINGS
         ☐ BURNS
         ☐ FRACTURES
         ☐ FROSTBITE
         ☑ HEAD INJURIES
  HEART ATTACK
         ☐ DEMOGRAPHICS
         ☐ DIET
         ☐ DRUGS
         ☐ MANAGEMENT/PREVENTION

DOCUMENT: DONE
```

FIG. 16

HEALTHSCOUT REGISTRATION - NETSCAPE

FILE EDIT VIEW GO COMMUNICATOR HELP

BACK FORWARD RELOAD HOME SEARCH GUIDE PRINT SECURITY STOP

BOOKMARKS NETSITE: .HEALTH.COM/CGI-BIN/WEBOBJECTS/REG.WOA/2/WO/BB2000VN6000S400/14.1.6.1.4

INSTANT MESSAGE  INTERNET  LOOKUP  NEW&COOL

WOMEN'S
- ☑ ABORTION
- ☐ ANOREXIA
- ☑ BREAST CANCER
- ☐ BREAST FEEDING
- ☐ BULIMIA
- ☐ CERVICAL CANCER
- ☑ CHILDBIRTH
- ☐ DILATION & CURETTAGE
- ☐ ENDOMETRIOSIS
- ☑ FEMININE PRODUCTS
- ☐ FIBROIDS
- ☐ FREQUENT DRY MOUTH

HORMONES
- ☐ ESTROGEN
- ☑ HORMONE REPLACEMENT THERAPY (HRT)

DOCUMENT: DONE

FIG. 17

HEALTHSCOUT: WATCHING THE MEDICAL WORLD FOR NEWS ABOUT YOU – NETSCAPE

FILE   EDIT   VIEW   GO   COMMUNICATOR   HELP

BACK   FORWARD   RELOAD   HOME   SEARCH   GUIDE   PRINT   SECURITY   STOP

BOOKMARKS  NETSITE: //WWW.HEALTHSCOUT.COM/CGI-BIN/WEBOBJECTS/AF.WOA/7/WO/IN6000FY400VU00002/1

INSTANT MESSAGE   INTERNET   LOOKUP   NEW&COOL

MARCH 16, 1999

MY HEALTHSCOUT

YOUR HEADLINES

- TAKING EXERCISE TO HEART
  WHICH TYPES HELP YOU MOST
- WHAT'S MORE IMPORTANT?
  A. HOW OFTEN YOU EXERCISE
  B. HOW LONG YOU EXERCISE
- YOM KIPPUR HEADACHE
  YOU DON'T HAVE TO BE JEWISH TO HAVE MIGRAINE

I WANT TO:

- VIEW MY HEADLINES
- VIEW MY FAMILY'S HEADLINES
- CHANGE MY PREFERENCES
- SIGN UP A NEW MEMBER
- LOG IN A DIFFERENT MEMBER

LIBRARY

· LOOK UP A DRUG

YOUR HEADLINE HISTORY

DOCUMENT: DONE

Revised Topic Flags & Sub-subcategories

| | |
|---|---|
| Abortion | ABOR |
| Acne | ACNE |
| Acupuncture | PUNC |
| Age Group: 0-1 Yr | 0001 |
| Age Group: 2-4 Yrs | 0204 |
| Age Group: 5-9 Yrs | 0509 |
| Age Group: 10-14 Yrs | 1014 |
| Age Group: 15-19 Yrs | 1519 |
| Age Group: 20-24 Yrs | 2024 |
| Age Group: 25-29 Yrs | 2029 |
| Age Group: 30-34 Yrs | 3034 |
| Age Group: 35-39 Yrs | 3039 |
| Age Group: 40-44 Yrs | 4044 |
| Age Group: 45-49 Yrs | 4049 |
| Age Group: 50-54 Yrs | 5054 |
| Age Group: 55-59 Yrs | 5059 |
| Age Group: 60-64 Yrs | 6064 |
| Age Group: 65-69 Yrs | 6069 |
| Age Group: 70-74 Yrs | 7074 |
| Age Group: 75-79 Yrs | 7579 |
| Age Group: 80 And Over | 80UP |
| Age Group: Under 55 | UN55 |
| Age Quotient: High | HIAQ |
| Age Quotient: Low | LOAQ |
| Aging: Other/General | AGE- |
| AIDS/HIV | AIDS |
| Alcohol: Other/General | ALCO |
| Alcohol: Teetotaling | TTOT |
| Allergies: Food | FDAL |
| Allergies: Nasal | NZAL |
| Allergies: Other/General | ALLR |
| Alternative Medicine: Other/General | ALTM |
| Alzheimer's | ALZH |
| Amblyopia (Lazy Eye) | AMBL |
| Anemia | ANEM |
| Anosmia | ANOZ |
| Antibiotics | ANTB |
| Antihistamines | ANTH |
| Antioxidants | ANTO |
| Anxiety | ANXI |
| Appendicitis | APPX |
| Arthritis: Osteo | OSTA |
| Arthritis: Other/General | ARTH |
| Arthritis: Rheumatoid | RHAR |
| Artificial Hips | AHIP |
| Artificial Knees | AKNE |
| Aspirin | ASPR |
| Asthma | ASTH |
| Athlete's Foot | ATHF |
| Autism | AUTI |

*FIG. 21*

| | |
|---|---|
| Backache | BACH |
| Bad Breath | BADB |
| Bedwetting | BEDW |
| Beta Carotene | BCAR |
| Birth Control | BIRC |
| Birth Defects: Other/General | BIRD |
| Birthday | BDAY |
| Bladder Infections | BLNF |
| Blindness | BLND |
| Blood Glucose Monitors | BGLU |
| Bowel Problems: Colostomy | COLS |
| Bowel Problems: Diverticulosis/Diverticulitis | DIVT |
| Bowel Problems: Gas | GAS- |
| Bowel Problems: Gastritis | GAST |
| Bowel Problems: Inflammatory Bowel Disease (IBD) | IBD- |
| Bowel Problems: Other/General | BOWL |
| Breast-Feeding | FEED |
| Bronchitis | BRON |
| Bunions | BUNI |
| Burns | BURN |
| Caffeine/Coffee/Tea | CAFF |
| Cancer: Bladder | -BLA |
| Cancer: Brain | -BRN |
| Cancer: Breast | -BRS |
| Cancer: Cervical | -CER |
| Cancer: Colon | -COL |
| Cancer: Esophageal | -ESO |
| Cancer: Laryngeal | -LAR |
| Cancer: Leukemia | -LEU |
| Cancer: Lung | -LUN |
| Cancer: Lymphoma | -LYM |
| Cancer: Mouth | -MOU |
| Cancer: Other/General | -GEN |
| Cancer: Ovarian | -OVA |
| Cancer: Pancreatic | -PAN |
| Cancer: Prostate | -PRO |
| Cancer: Rectal | -REC |
| Cancer: Skin | -SKI |
| Cancer: Throat | -THR |
| Cancer: Uterine | -UTR |
| Carpal Tunnel Syndrome | CARP |
| CAT Scans | CATS |
| Cataracts | CATR |
| Chickenpox | CHPX |
| Childbirth | CHBR |
| Chiropractic | CHIR |
| Cholesterol: Dietary | CHOD |
| Circumcision | CIRC |
| Cirrhosis | CIRR |
| Cleft Lip/Palate | CLEF |
| Colic | COLI |
| Colonoscopy | COLN |
| Color Blindness | CBLI |

*FIG. 21a*

| | |
|---|---|
| Common Cold | COLD |
| Condoms | COND |
| Conjunctivitis (Pink Eye) | CONJ |
| Irregularity/Constipation | IRRG |
| Cosmetic Surgery | CSUR |
| Coughs | COUG |
| Cradle Cap | CCAP |
| Cramps: Menstrual | CMEN |
| Cramps: Muscle | CMUS |
| Cysts | CYST |
| Dandruff | DAND |
| Death & Dying: Other/General | DEAD |
| Dental Problems: Other/General | DENT |
| Dentures | FALS |
| Depression | DEPR |
| Diabetes: General/Other | DIAB |
| Diabetes: Type I | DIA1 |
| Diabetes: Type II | DIA2 |
| Diaper Rash | DIAP |
| Diarrhea | DIAR |
| Dieting To Avoid Caffeine | DCAF |
| Dieting To Avoid Lactose Or Milk | DLAC |
| Dieting To Control Cholesterol | DCHO |
| Dieting To Control Salt Intake | DSOD |
| Dieting To Gain Or Maintain Weight | DGOM |
| Dieting To Gain Weight | DGAI |
| Dieting To Increase Fiber Intake | DFBR |
| Dieting To Lose Weight | DLOS |
| Dieting To Lower Fat Intake | DFAT |
| Dieting To Maintain Weight | DMAI |
| Dieting To Reduce Or Eliminate Sugar | DSUG |
| Dilation & Curettage (D&C) | DILC |
| Dose Adjusting | DOSE |
| Down Syndrome | DOWN |
| Drug Abuse | DRAB |
| Drunk Driving/Riding | DRDR |
| Dyslexia | DYSL |
| Ear Infections | EARI |
| Eating/Appetite Disorders | EATD |
| Emergencies/First Aid | EMER |
| Emotional Disorders: General/Other | EMOT |
| Emphysema | EMPH |
| Employment Status: Full-Time | FULL |
| Employment Status: Homemaker | HOME |
| Employment Status: Part-Time | PART |
| Employment Status: Retired | RETI |
| Employment Status: Unable To Work | UABL |
| Employment Status: Unemployed | UNEM |
| Endometriosis | ENDO |
| Estrogen | ESTR |
| Exercise: Aerobics/Calisthenics | AERO |
| Exercise: Baseball/Softball | BALL |
| Exercise: Basketball | BASK |

*FIG. 21b*

| | |
|---|---|
| Exercise: Bowling | BOWL |
| Exercise: Canoeing/Kayaking/Rowing | CANU |
| Exercise: Climbing | CLIM |
| Exercise: Cycling | CYCL |
| Exercise: Dancing | DANC |
| Exercise: Diving, Board/Platform | DIVE |
| Exercise: Diving, Skin | DIVS |
| Exercise: Fencing | FENC |
| Exercise: Football | FBAL |
| Exercise: Gardening | GARD |
| Exercise: General/Other | EXER |
| Exercise: Golf | GOLF |
| Exercise: Gym | GYMX |
| Exercise: Gymnastics | GYMN |
| Exercise: Handball | HNDB |
| Exercise: Hiking/Backpacking | HIKE |
| Exercise: Hockey, Field | FHOC |
| Exercise: Hockey, Ice | HOCK |
| Exercise: Home | HOMX |
| Exercise: Horseback Riding | HORS |
| Exercise: Jogging/Running | JRUN |
| Exercise: Lacrosse | LACR |
| Exercise: Machine | MCHX |
| Exercise: Martial Arts | MART |
| Exercise: Paddleball | PADDL |
| Exercise: Ping Pong/Table Tennis | PONG |
| Exercise: Racquetball | RACQ |
| Exercise: Rope Skipping | SKIP |
| Exercise: Sailing | SAIL |
| Exercise: Shuffleboard | SHUF |
| Exercise: Skating, Ice | SKAT |
| Exercise: Skating, Inline/Roller | ROLL |
| Exercise: Skiing, Cross-Country | XSKI |
| Exercise: Skiing, Downhill/Snowboarding | DSKI |
| Exercise: Skiing, Water | WSKI |
| Exercise: Soccer | SOCC |
| Exercise: Spinning | SPIN |
| Exercise: Squash | SQUA |
| Exercise: Stepping | STEP |
| Exercise: Surfing | SURF |
| Exercise: Swimming | SWIM |
| Exercise: Tennis | TENN |
| Exercise: Trampolining | TRAM |
| Exercise: Treadmill | MILL |
| Exercise: Volleyball | VOLL |
| Exercise: Walking | WALK |
| Exercise: Water Exercise | WTRX |
| Exercise: Weight Lifting | LIFT |
| Exercise: Windsurfing | WIND |
| Exercise: Wood Chopping/Sawing | WOOD |
| Exercise: Wrestling | WRES |
| Exercise: Yoga | YOGA |
| Eye/Vision Problems: Other/General | EYES |

*FIG. 21c*

| | |
|---|---|
| Fat: Body | BFAT |
| Fat: Dietary | DFAT |
| Fatherhood | FATH |
| Fatigue | FATI |
| Feminine Products | FEMP |
| Fever | FEVR |
| Fibroids | FBRD |
| Fitness Equipment | FTEQ |
| Floaters (Eye) | FLOA |
| Flu | FLU- |
| Foot Problems: Other/General | FOOT |
| Fractures | FRAC |
| Frequent Dry Mouth | DRYM |
| Frostbite | FROS |
| Funerals | FUNR |
| Fungal Infections | FUNG |
| Gallbladder Problems: Other/General | GALL |
| Gallstones | GSTO |
| Gender: Female | FEMA |
| Gender: Male | MALE |
| Glaucoma | GLAU |
| Gout | GOUT |
| Grave's Disease | GRAV |
| Hair And Scalp Problems: Other/General | HAIR |
| Hair Loss | BALD |
| Hammertoes | HTOE |
| Headaches | HACH |
| Hearing Aids | HAID |
| Hearing Disorders: Other/General | HEAR |
| Hearing Loss | DEAF |
| Heart Pacemakers | PACE |
| Heart/Stroke-Related Problems: Aneurysm | ANEU |
| Heart/Stroke-Related Problems: Angina | ANGN |
| Heart/Stroke-Related Problems: Coronary-Artery Disease | CORA |
| Heart/Stroke-Related Problems: Heart Attack | HATT |
| Heart/Stroke-Related Problems: High Blood Pressure | HIBP |
| Heart/Stroke-Related Problems: High Cholesterol | HICH |
| Heart/Stroke-Related Problems: Other/General | HRTS |
| Heart/Stroke-Related Problems: Rheumatic Heart Disease | RHHD |
| Heart/Stroke-Related Problems: Stroke | STRO |
| Heartburn/GERD/Indigestion | GERD |
| Heat/Sun Stroke | HEAT |
| Height: Medium | MEDH |
| Height: Short | SHOR |
| Height: Tall | TALL |
| Hemophilia | HEMO |
| Hemorrhoids | HEMR |
| Hepatitis | HEPA |
| Herbal Medicine | HERB |
| Hernia | HERN |
| Herpes: Genital | HERP |
| Herpes: Simplex | HRPS |
| High Mileage | HIMI |

*FIG. 21d*

| | |
|---|---|
| Hives | HIVE |
| Homeopathy | HMEO |
| Homosexuality | HOMO |
| Hormone Replacement Therapy | HRT- |
| Hormones: Female | FHOR |
| Hormones: Male | MHOR |
| Hormones: Other/General | HORM |
| Hormones: Thyroid | THOR |
| Hospices | HSPC |
| Hyperactivity | HYPR |
| Hypnosis | HYPN |
| Hysterectomy | HYST |
| Immunization | IMMU |
| Impetigo | IMPE |
| Impotence | IMPO |
| Incontinence | INCO |
| Infections: Other/General | INFC |
| Infertilityxxxx | INFR |
| Insect Bites & Stings | BITE |
| Insulin | INSU |
| Insurance: Blue Cross/Blue Shield | BLUE |
| Insurance: Disability | DISA |
| Insurance: HMOs | HMOS |
| Insurance: Lack Of | NINS |
| Insurance: Life | LIFI |
| Insurance: Long-Term Care | TERM |
| Insurance: Medicaid | MAID |
| Insurance: Medicare | MCAR |
| Insurance: Medicare + Private Insurance | MPRI |
| Insurance: Other | INSR |
| Insurance: PPOs | PPOS |
| Insurance: Private | PRIV |
| Insurance: Veterans/CHAMPUS | VETS |
| Jaw Problems | JAWP |
| Jock Itch | JOCK |
| Joint Problems: Other/General | JOIN |
| Kidney Problems: Other/General | KIDN |
| Kidney Stones | KSTN |
| Knee Problems | KNEE |
| Laryngitis | LARN |
| Laser Surgery | LSUR |
| Laxatives | LAXA |
| Learning Disabilities: Other/General | LEAR |
| Lice: Crab | CRAB |
| Lice: Head | LICE |
| Liposuction | LIPO |
| Liver Disease: Other/General | LIVR |
| Living With: Alone | LWAL |
| Living With: Non-Family | LWNF |
| Living With: Other Family | LWOF |
| Living With: Spouse | LWSP |
| Lungs | LUNG |
| Lupus | LUPS |

*FIG. 21e*

| | |
|---|---|
| Lyme Disease | LYME |
| Macular Degeneration | MACD |
| Mail-Order Drugs | MODR |
| Marital Status: Divorced | MDIV |
| Marital Status: Married | MARR |
| Marital Status: Never Married | NMAR |
| Marital Status: Separated | SEPA |
| Marital Status: Widowed | WIDO |
| Massage | MASS |
| Measles | MEAS |
| Memory | MEMO |
| Meniere's Disease | MEND |
| Menopause/Postmenopause | MENO |
| Menstruation | MENS |
| Mental Health | MENT |
| Migraine | MIGR |
| Miscarriage | MCAR |
| Mobility/Balance | MBAL |
| Mononucleosis | MONO |
| Motherhood | MOTH |
| MRI Scans | MRIS |
| Multiple Sclerosis | MSCL |
| Mumps | MUMP |
| Naturopathy | NATU |
| Neck Problems | NECK |
| Nerve Disorders | NERV |
| Night Vision | NVIS |
| Nose Bleeds | NBLD |
| Nose Surgery | NSUR |
| Nursing Homes/Elder Care | NHOM |
| Nutrition Score: High | HNUT |
| Nutrition Score: Low | LNUT |
| Nutritional Supplements | NSUP |
| Obesity | OBES |
| Obstetrics | OBST |
| Online Services: America Online | AOLL |
| Online Services: Compuserve | COMP |
| Online Services: HealthScout | SCOU |
| Online Services: Internet Service Provider | ISPS |
| Online Services: Microsoft Network | MSNN |
| Online Services: Other/General | ONLN |
| Online Services: Prodigy | PRODI |
| Online Services: Remedy Online | REMD |
| Online Services: Search Engines | SRCH |
| Organ Donation | ORGN |
| Orgasm | ORGZ |
| Osteopathy | OSTY |
| Osteoporosis | OSTO |
| Overweight/Underweight | OUWT |
| Ovulation | OVUL |
| Pain | PAIN |
| Panic Attacks | PNIC |
| Pap Smears | PAPS |

*FIG. 21f*

| | |
|---|---|
| Parasites: Other/General | PARA |
| Parkinson's | PARK |
| Pediatrics | PEDI |
| Perspiration | PRSP |
| Pets And Health | PETS |
| PMS | PMSS |
| Pneumoconiosis | PNCO |
| Pneumonia | PNEU |
| Pregnancy | PREG |
| Press, Medical/Health | PRESS |
| Prostate Problems | PROS |
| Prostheses: Other/General | PRST |
| Puberty | PUBE |
| Quackery | QUAC |
| Rabies | RABI |
| Race/Origin: African-American | AFAM |
| Race/Origin: American Indian | AMIN |
| Race/Origin: Asian | ASIA |
| Race/Origin: Hispanic | HISP |
| Race/Origin: Other/General | ROTH |
| Race/Origin: White | WHIT |
| Rashes | RASH |
| Raynaud's Disease | RAYN |
| Relaxation Therapy | RLAX |
| Religion: Atheist | ATHE |
| Religion: Buddhist | BUDD |
| Religion: Catholic | CATH |
| Religion: Hindu | HIND |
| Religion: Jewish | JEWI |
| Religion: Mormon | MORM |
| Religion: Moslem | MOSL |
| Religion: Other/General | RELO |
| Religion: Protestant | PROT |
| Respiratory Problems: Flu/Pneumonia | FLUP |
| Respiratory Problems: Other/General | RESP |
| Retirement Planning | RPLN |
| Reye's Syndrome | REYE |
| Ringworm | RWRM |
| Safety: Child | SFCH |
| Safety: Fire | SFIR |
| Safety: Other/General (drowning, falling, etc) | SOTH |
| Safety: Water | SWTR |
| Salt/Sodium | SALT |
| Scabies | SCAB |
| Sciatica | SCIA |
| Seasonal Affective Disorder (SAD) | SADD |
| Seat Belts | SEAT |
| Sedatives | SEDA |
| Seizures | SEIZ |
| Sex | SEXX |
| Sexually Transmitted Diseases: Other/General | STDS |
| Shin Splints | SHIN |
| Shingles | SHNG |

*FIG. 21g*

| | |
|---|---|
| Sickle-Cell Anemia | SIKL |
| Sinus Problems (Sinusitis) | SINU |
| Skin Care | SKCR |
| Skin Disorders: Dry Skin | DRSK |
| Skin Disorders: Eczema | ECZM |
| Skin Disorders: Itchiness | ITCH |
| Skin Disorders: Other/General | SKIN |
| Skin Disorders: Psoriasis | PSOR |
| Skin Disorders: Rosacea | ROSA |
| Skin Disorders: Warts | WART |
| Sleep Problems: Apnea | APNE |
| Sleep Problems: Other/General | SLEE |
| Sleep Problems: Snoring | SNOR |
| Sore Throat | SORE |
| Speeding | SPEE |
| Spina Bifida | SPBF |
| Spine | SPIN |
| Sports Medicine | SMED |
| Sprains | SPRN |
| State: Alabama | STAL |
| State: Alaska | STAK |
| State: Arizona | STAZ |
| State: Arkansas | STAR |
| State: California | STCA |
| State: Colorado | STCO |
| State: Connecticut | STCT |
| State: Delaware | STDE |
| State: District of Columbia (DC) | STDC |
| State: Florida | STFL |
| State: Georgia | STGA |
| State: Hawaii | STHI |
| State: Idaho | STID |
| State: Illinois | STIL |
| State: Indiana | STIN |
| State: Iowa | STIA |
| State: Kansas | STKS |
| State: Kentucky | STKY |
| State: Louisiana | STLA |
| State: Maine | STME |
| State: Maryland | STMD |
| State: Massachusetts | STMA |
| State: Michigan | STMI |
| State: Minnesota | STMN |
| State: Mississippi | STMS |
| State: Missouri | STMO |
| State: Montana | STMT |
| State: Nebraska | STNE |
| State: Nevada | STNV |
| State: New Hampshire | STNH |
| State: New Jersey | STNJ |
| State: New Mexico | STNM |
| State: New York | STNY |
| State: North Carolina | STNC |

*FIG. 21h*

| | |
|---|---|
| State: North Dakota | STND |
| State: Ohio | STOH |
| State: Oklahoma | STOK |
| State: Oregon | STOR |
| State: Other | STOT |
| State: Pennsylvania | STPA |
| State: Rhode Island | STRI |
| State: South Carolina | STSC |
| State: South Dakota | STSD |
| State: Tennessee | STTN |
| State: Texas | STTX |
| State: Utah | STUT |
| State: Vermont | STVT |
| State: Virginia | STVA |
| State: Washington | STWA |
| State: West Virginia | STWV |
| State: Wisconsin | STWS |
| State: Wyoming | STWY |
| Steroids | STER |
| Stomach Trouble | STOM |
| Strep Infections | STRP |
| Stress | STRS |
| Stye | STYE |
| Sudden Infant Death Syndrome (SIDS) | SIDS |
| Suicide | SUIC |
| Sunburn/Tan | SUNB |
| Sunscreens/Lotions | SSCR |
| Support Groups | SUPP |
| Surgery: Other/General | SURG |
| Tapeworm | TAPE |
| Teething | TEET |
| Testicles | TEST |
| Tetanus | TETN |
| Tinnitus | TINN |
| Tobacco: Chewing Or Snuff Use | CHEW |
| Tobacco: Cigar Smoking | CGAR |
| Tobacco: Cigarette Smoking | CIGS |
| Tobacco: Other/General | TOBA |
| Tobacco: Pipe Smoking | PIPE |
| Toilet Training | TOIL |
| Tonsils | TONS |
| Travel Medicine | TRMD |
| Travel Safety: Midsize Car Or Minivan | SMID |
| Travel Safety: Motor Vehicle Injury | SMVI |
| Travel Safety: Motorcycle | SMOT |
| Travel Safety: Other/General | STRV |
| Travel Safety: Sport/Utility Vehicle | SSUV |
| Travel Safety: Subcompact/Compact | SSUB |
| Travel Safety: Truck/Full-Size Van | STRK |
| Travel: Abroad | TRAB |
| Travel: Other/General | TRAV |
| Travel: U.S. | TRUS |
| Ulcers | ULCR |

FIG. 21i

| | |
|---|---|
| Urinary Tract Infections | UTIN |
| Urine Problems | URIN |
| Uterus | UTRS |
| Vaginal Problems | VAGI |
| Varicose Veins | VARI |
| Vasectomy | VSEC |
| Vegetarianism | VEGE |
| Viruses | VIRS |
| Vitamins/Minerals | VITA |
| Water Consumption | WATR |
| Weight Gain | WTGN |
| Weight Loss | WTLS |
| Weight: Other/General | WEIG |
| Wills | WILL |
| Women's Problems: Other/General | WMEN |
| X-Rays | XRAY |
| Yeast Infections | YEAS |

*FIG. 21j*

The "E" Chart
(Clicking on the chart will flip all of the Es to different orientations.)
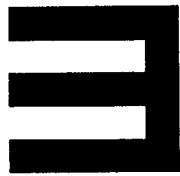
1  20/100                                    20/30  4
2  20/70                                     20/20  5
3  20/40                                     20/15  6
*FIG. 22*

On your screen, how wide is the black square? (Click one.)

[Note: set the following as fractions, if possible.]

O 5/8 inch

O 3/4 inch

O 7/8 inch

O 1 inch

O 1 1/8 inches

O 1 1/4 inches

O 1 3/8 inches

O 1 1/2 inches

During tests 1 and 2, stand or sit so your eyes are ▢ feet, ▢ inches from your computer's screen.

```
2. CHOOSE YOUR METHOD
TAKE THE 7-MINUTE CHECKUP.

( ) ABOUT 7 MINUTES
      BESIDES PERSONALIZING YOUR NEWS, THE 7-MINUTE CHECKUP DELIVERS A
      MULTI-PAGE REPORT SHOWING YOUR HIDDEN HEALTH RISKS AND WHAT TO DO ABOUT
      THEM. YOU CAN PRINT THE REPORT FOR YOUR PHYSICIAN.

[ BEGIN 7-MINUTE CHECKUP ]

OR

HAND PICK YOUR TOPICS ( ) ABOUT 10 MINUTES
      FOR DETAILED PERSONALIZATION (RECOMMENDED), FIRST CHOOSE YOUR CATEGORIES
      BELOW, THEN CLICK "ADD DETAILS".

( ) ABOUT 1 MINUTE
      FOR ROUGH PERSONALIZATION, JUST CHECK YOUR CATEGORIES AND CLICK "FINISH".
      THIS WILL BRING YOU NEWS ON ONLY A FEW REPRESENTATIVE TOPICS IN EACH
      CATEGORY YOU CHECK

□ AGING                        □ LOVE/SEX/RELATIONSHIPS
      □ ALTERNATIVE MEDICINE         □ MEN'S
      □ DISEASES & CONDITIONS        □ MISCELLANEOUS
      □ DRUGS/ALCOHOL/TOBACCO        □ NUTRITION/FITNESS/LOOKS
      □ HEALTH BIZ                   □ SAFETY & PUBLIC HEALTH
      □ KIDS                         □ WOMEN'S
```

FIG. 26

REMEDY ONLINE - NETSCAPE

FILE EDIT VIEW GO COMMUNICATOR HELP

BACK FORWARD RELOAD HOME SEARCH GUIDE PRINT SECURITY STOP

BOOKMARKS NETSITE: HTTP://WWW.HEALTSCOUT.COM/CGI-BIN/WEBOBJECTS/REG.WOA/7/WO/SJ0O00VL000AH3006/3.1.12.1.3 WHAT'S RELATED

JOINING HEALTHSCOUT

THE 7-MINUTE CHECKUP

SMOKING
* HOW WOULD YOU DESCRIBE YOUR CIGARETTE SMOKING HABITS?
  ○ NEVER SMOKED CIGARETTES
  ○ USED TO SMOKE CIGARETTES
  ○ STILL SMOKE CIGARETTES

LATELY, HOW MANY CIGARETTES PER DAY DO YOU USUALLY SMOKE?   [0] CIGARETTES PER DAY

HOW MANY CIGARS?   [0] CIGARS PER DAY

HOW MANY PIPEFULS OF TOBACCO?   [0] PIPEFULS PER DAY

HOW MANY TIMES PER DAY DO YOU USUALLY USE SMOKELESS TOBACCO (CHEWING TOBACCO, SNUFF PUCHES, ETC)?   [0] TIMES PER DAY

FORMER SMOKER
ANSWER THESE TWO QUESTIONS IF YOU SELECTED "USED TO SMOKE CIGARETTES"

DOCUMENT: DONE

START  ACT-(CONTACT..  HEALTHSCOUT...  RE:COUPLA THIN..  MICROSOFT WORD..  10:39AM

FIG. 27

REMEDY ONLINE – NETSCAPE

FILE EDIT VIEW GO COMMUNICATOR HELP

BACK FORWARD RELOAD HOME SEARCH GUIDE PRINT SECURITY STOP

BOOKMARKS / NETSITE: HTTP://WWW.HEALTSCOUT.COM/CGI-BIN/WEBOBJECTS/REG.WOA/7/WO/SJ0000VL000AH3006/4.1.14.1.1 / WHAT'S RELATED

JOINING ☼ HEALTHSCOUT

THE 7-MINUTE CHECKUP
TRAVEL

IN THE NEXT 12 MONTHS, HOW
MANY MILES WILL YOU PROBABLY    [12000] MILES
TRAVEL BY MOTORCYCLE, CAR
TRUCK OR VAN? (U.S AVERAGE IS
ABOUT 10,000 MILES).

* ON A TYPICAL DAY, HOW DO YOU     ○ MOTORCYCLE
  USUALLY TRAVEL?                  ⦿ SUBCOMPACT OR COMPACT CAR
                                   ○ MID-SIZE OR FULL-SIZE CAR OR MINIVAN
                                   ○ TRUCK OR FULL SIZE VAN
                                   ○ SPORT/UTILITY VEHICLE
                                   ○ OTHER

* WHAT PERCENT OF THE TIME DO      ⦿ 100%
  YOU USUALLY BUCKLE YOUR SEAT     ○ 75-99%
  BELT WHEN DRIVING OR RIDING?     ○ 50-74%
                                   ○ 25-49%
                                   ○ LESS THAN 25%

* ON AVERAGE, HOW CLOSE TO THE   ○ UNDER OR LESS THAN 5 MPH OVER THE

DOCUMENT: DONE

START | ACT-(CONTACT... | HEALTHSCOUT... | RE:COUPLA THIN... | MICROSOFT WORD...    10:39AM

FIG. 28

JOINING ☼ HEALTHSCOUT

THE 7-MINUTE CHECKUP (YOU ARE NOW HALFWAY THROUGH THE CHECKUP).

DRINKING

HOW MANY TIMES IN THE PAST
MONTH DID YOU TRAVEL IN A      [0] TIMES IN THE PAST MONTH
VEHICLE WHOSE DRIVER (EITHER
YOU OR SOMEONE ELSE) HAD
PROBABLY HAD TOO MUCH
ALCOHOL TO DRINK?

HOW MANY ALCOHOL DRINKS          [0] BOTTLES OR CANS OF BEER
DO YOU HAVE IN A TYPICAL         [0] GLASSES OF WINE
WEEK?                            [0] WINE COOLERS
                                 [0] MIXED DRINKS OR SHOTS

FOR A HEIGHT OF 67 INCHES AND A MEDIUM FRAME, 130 POUNDS IS ABOUT 10 PERCENT
UNDERWEIGHT. YOUR DESIREABLE WEIGHT RANGE IS 136 TO 150.

YOUR 10 MOST LIKELY CAUSES OF DEATH

| CAUSE OF DEATH | HOW YOUR RISK COMPARES WITH THE AVERAGE 43-YEAR-OLD WOMAN'S. | CHANCES PER 100,000 OF DEATH FROM THIS CAUSE DURING THE NEXT 10 YEARS | | |
|---|---|---|---|---|
| | | YOURS | AVERAGE | ACHEIVABLE |
| MISCELLANEOUS | AVERAGE | 709 | 709 | 709 |
| MOTOR VEHICLE | 281% ABOVE AVERAGE | 290 | 76 | 122 |
| INJURY | 28% BELOW AVERAGE | 282 | 389 | 282 |
| BREAST CANCER | AVERAGE | 82 | 82 | 82 |
| OVARIAN CANCER | AVERAGE | 82 | 82 | 82 |
| COLON CANCER | AVERAGE | 81 | 81 | 81 |
| SUICIDE | 19% BELOW AVERAGE | 77 | 95 | 77 |
| LIVER CIRRHOSIS | 10% BELOW AVERAGE | 61 | 68 | 61 |
| DIABETES | AVERAGE | 51 | 51 | 51 |
| LYMPHOMA | AVERAGE | 45 | 45 | 45 |
| HIGH BLOOD PRESSURE | | | | |

SUGGESTION (NOTE: SUGGESTIONS FOR SOME CAUSES OF DEATH MAY BE MORE EXTENSIVE THAN FOR OTHERS.
WITHIN A FEW WEEKS, WE'LL PRESENT A COMPLETE "MINI-ARTICLE" ON EACH CAUSE. THAT'S
ANOTHER GOOD REASON TO RETAKE THE CHECKUP LATER).

*FIG. 34*

```
REMEDY ONLINE - NETSCAPE                                              _ □ X
FILE  EDIT  VIEW  GO  COMMUNICATOR  HELP
  ◁     ▷    ↻    ⌂    ⌕    ⏚    ⎙    ⎕    ⊗
 BACK FORWARD RELOAD HOME SEARCH GUIDE PRINT SECURITY STOP               N
 BOOKMARKS  NETSITE: HTTP://WWW.HEALTHSCOUT.COM/CGI-BIN/WEBOBJECTS/REG.WOA/7/WO/SJ0000VL000AH3006/8.1.24.1.0  WHAT'S RELATED
```

ANOTHER GOOD REASON TO RETAKE THE CHECKUP LATER).

HERE'S WHAT YOU CAN DO TO IMPROVE YOUR ODDS AGAINST THESE 10 CAUSES:

MISCELLANEOUS

IF "MISCELLANEOUS" IS ONE OF YOUR 10 MOST LIKELY CAUSES OF DEATH, YOU'RE EITHER LEADING AN UNUSUALLY HEALTHY LIFE OR YOUR RISKS ARE TOO PERCULIAR TO RANK AMONG THE 42 MOST COMMON CAUSES THAT THIS APPRAISAL COVERS. CONSIDER YOURSELF VERY LUCKY--OR VERY SMART.

IN YOUR CASE...

YOUR CHECKUP ANSWERS DON'T REVEAL ANY CHOICES KNOWN TO PROMOTE THIS CAUSE OF DEATH. IT PROPABLY RANKS AMOUNG YOUR 10 MOST LIKELY ONLY BECAUSE YOU BELONG TO A POPULATION GROUP WITH A HIGHER INCIDENCE THAN MOST (IF YOU'RE A MEMBER OF HEALTHSCOUT, THIS CAUSE OF DEATH WILL GET PRIORITY IN YOUR CUSTOM NEWS).

MOTOR VEHICLE INJURY

HERE'S AN UNNERVING STATISTIC: CAR CRASHES--WHICH USUALLY ARE TOTALLY PREVENTABLE-- ARE THE EIGHT LEADING CAUSE OF DEATH IN THE U.S. FOR PEOPLE AGES 6 TO 27, THEY'RE NUMBER ONE.

YET YOU PROBABLY THINK YOU'RE A GOOD DRIVER. CHANCES ARE, YOU'RE RIGHT. OFTEN IT IS THE "OTHER GUY" YOU HAVE TO WATCH OUT FOR. BUT HOW DO YOU AVOID BAD LUCK? AND HOW DO YOU KEEP YOURSELF FROM TURNING INTO THE "OTHER GUY" IN A FEW DISTRACTED SECONDS?

STATISTICALLY, THE TWO BEST WAYS TO STEER CLEAR OF AN ACCIDENT ARE TO STAY SOBER-- ALCOHOL IS INVOLVED IN ALMOST 40 PERCENT OF ALL TRAFFIC FATALITIES--AND OBSERVE SPEED LIMITS. BUT TWO OTHER RULES CAN GO A LONG WAY TOWARD KEEPING YOU OUT OF THE OTHER GUY'S WAY.

FIRST, MAKE A HABIT OF LOOKING WELL DOWN THE ROAD, SCANNING FROM SIDE TO SIDE ABOUT 10 TO 15 SECONDS AHEAD OF YOU (ROUGHLY A CITY BLOCK OR, ON HIGHWAY, A QUARTER MILE).
SECOND, WATCH OUT FOR DRIVERS WHO AREN'T PAYING ATTENTION, CAN'T WELL, ARE DRIVING ERRATICALLY OR SEEM DISTRACTED OR CONFUSED.

```
DOCUMENT: DONE
START  ACT-(CONTACT..  HEALTHSCOUT...  RE:COUPLA THIN..  MICROSOFT WORD..   10:41AM
```

The Amsler Grid

HEADLINE POSTING ALGORITHM

FIELD OF THE INVENTION

The present invention relates to data management and transformation. More specifically, the present invention relates to the method of providing personalized data to the user in accordance with the user's profile using assigned parameters to determine which data is delivered to the particular user.

BACKGROUND OF THE INVENTION

The World Wide Web is a hypertext based Internet information service. The idea behind the hypertext is that instead of reading text in a rigid linear structure (such as a book), a user can skip from one point to another. It is possible to get more information on the topic, go back, jump to other topics, and navigate through the text.

Information takes up a great deal of space, particularly when it includes images and multimedia capabilities. The Web is successful in providing so much information because that information is distributed globally across thousands of Web sites, each of which contributes the space for the information it publishes.

One distinctive feature of the Web is that it is interactive. Interactivity is the ability to "talk back" to the Web server. More traditional media such as television are not interactive at all. Other than changing a channel the viewer has little control over the content. The Web is inherently interactive: the act of selecting a link and jumping to another Web page to go somewhere else on the Web is a form of interactivity. In addition to this simple interactivity, however, pages can be designed to contain interactive forms that readers can fill out. Forms can contain text-entry areas, radio buttons, or simple menus of items. When the form is submitted, the information readers type is sent back to the server where pages originated. Despite this interactivity, however, users are still unable to limit the stream of information they are getting to the information they actually want to see.

One of the biggest problems people encounter when they explore the Web is finding information they are particularly looking for. Many Web sites providing a huge number of bytes of information are now equipped with global search engines, which search through the content of various databases looking for words that match user's query. However, this method produces a large number of irrelevant results. Consequently, the user spends a lot of time sorting through the data looking for the desired information.

Such time consuming process is especially undesirable when the searcher is looking for health related information. There are many web sites that offer information about new developments in medicine and health. It is also especially important for this type of information to be tailored to the specific needs of individual users. However, at the present time there is no efficient way of searching for specific information that the user needs or desires.

SUMMARY OF THE INVENTION

It is an object of the present invention to provide a data management system that will allow Web surfers to receive information in accordance with their interests.

It is another object of the present invention to provide an interactive Internet tool that will automatically deliver personalized information to each user.

It is a further object of the present invention to provide an interactive data management Internet tool that will minimize content searching time.

Other objects, advantages and features of this invention will be more apparent hereinafter.

The program uses the topic interest flags to determine which articles and other customizable elements of the database are shown on a particular member's home page. The headline posting algorithm first checks the flags on every available item against the member's interests, recorded in his or her user profile, then weighs the importance, rarity and significance of each match it has found, and finally displays the three highest-scoring items on the member's home page in descending order of value.

BRIEF DESCRIPTION OF THE DRAWINGS

A full understanding of the invention can be gained from the following description of the preferred embodiment when read in conjunction with the accompanying drawings in which:

Figure 4:
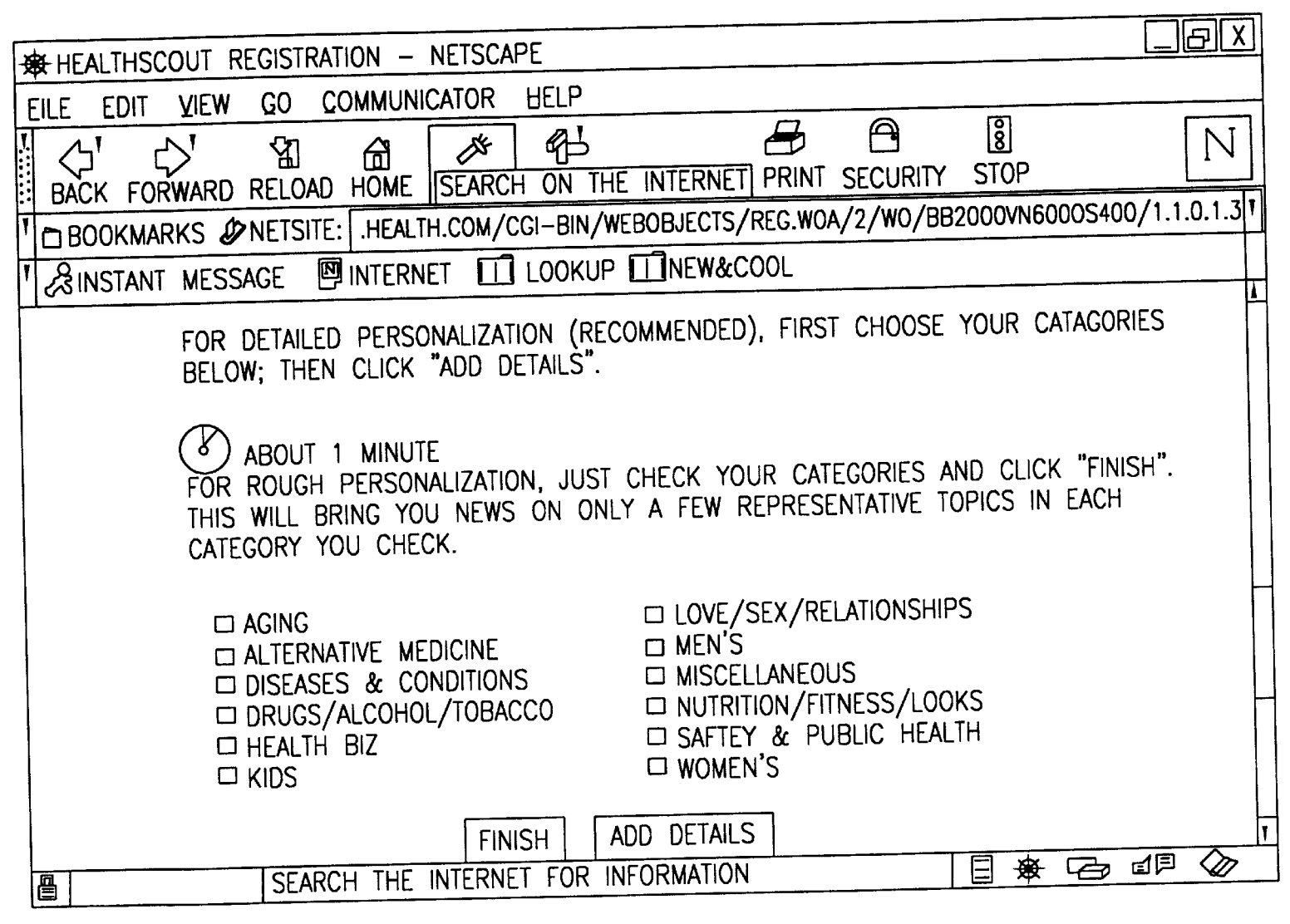

FIG. 4 is a registration screen which allows each user to select among the short list of very broad topics;

FIGS. 5–16 are registration screens which are presented to each user who selects the topics shown in FIG. 4;

FIG. 17 is the screen featuring three headlines on the Member's Home-Page selected for one particular user;

FIG. 21 is a partial list of topic flags used by the algorithm to identify user's interests;

FIG. 22 is the E-chart used to perform the Home Eye Exam;

FIG. 23 is a dialog box which is used for accurate scaling of the E-chart;

FIG. 24 is a 7-minute check-up opening screen;

Figure 30:
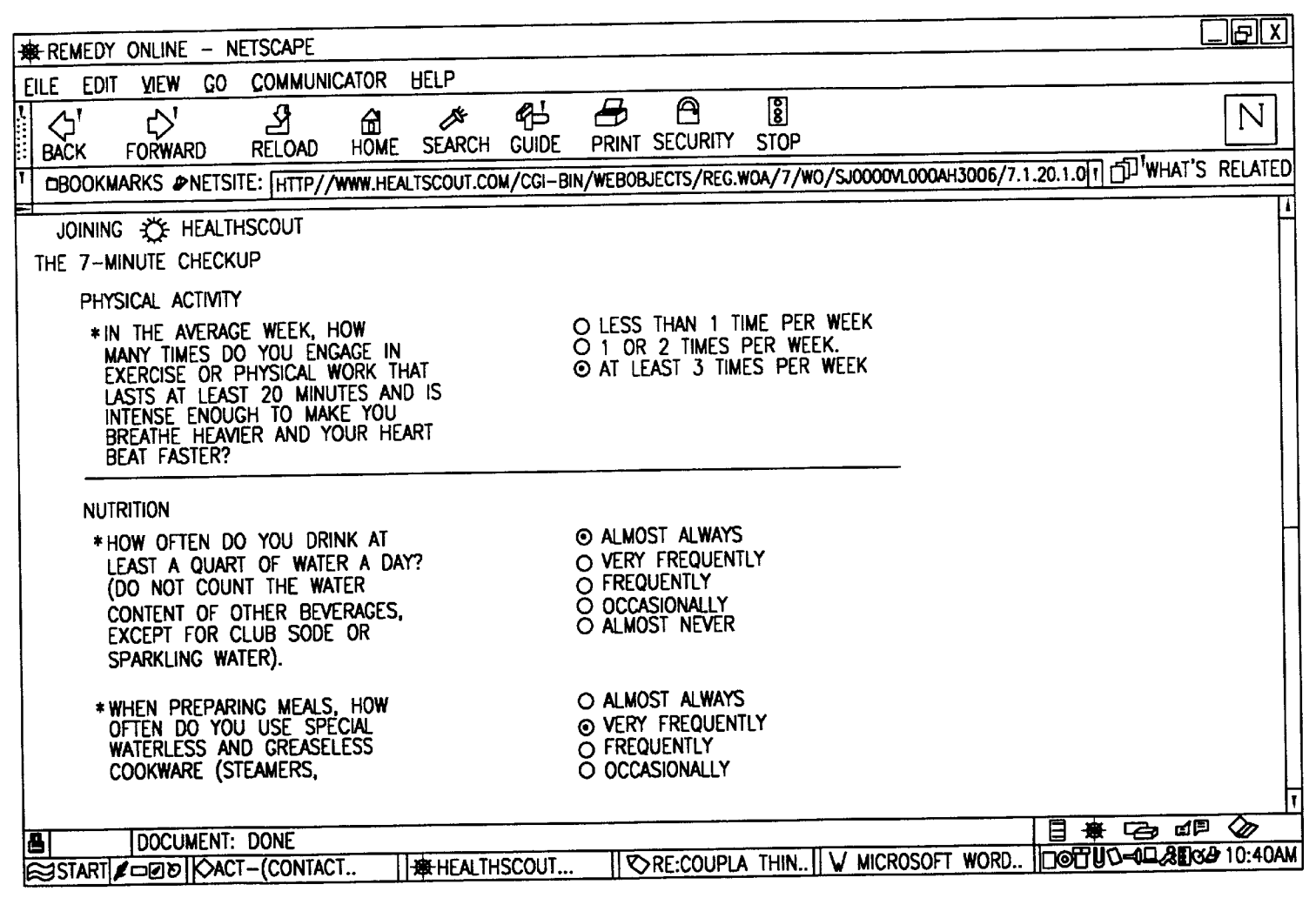

FIGS. 25–30 are check-up screens which are presented to each user who selects the 7-minute check-up from FIG. 24;

FIGS. 31–34 are check-up results screens; and

DETAILED DESCRIPTION OF THE PREFERRED EMBODIMENT

Figure 1:
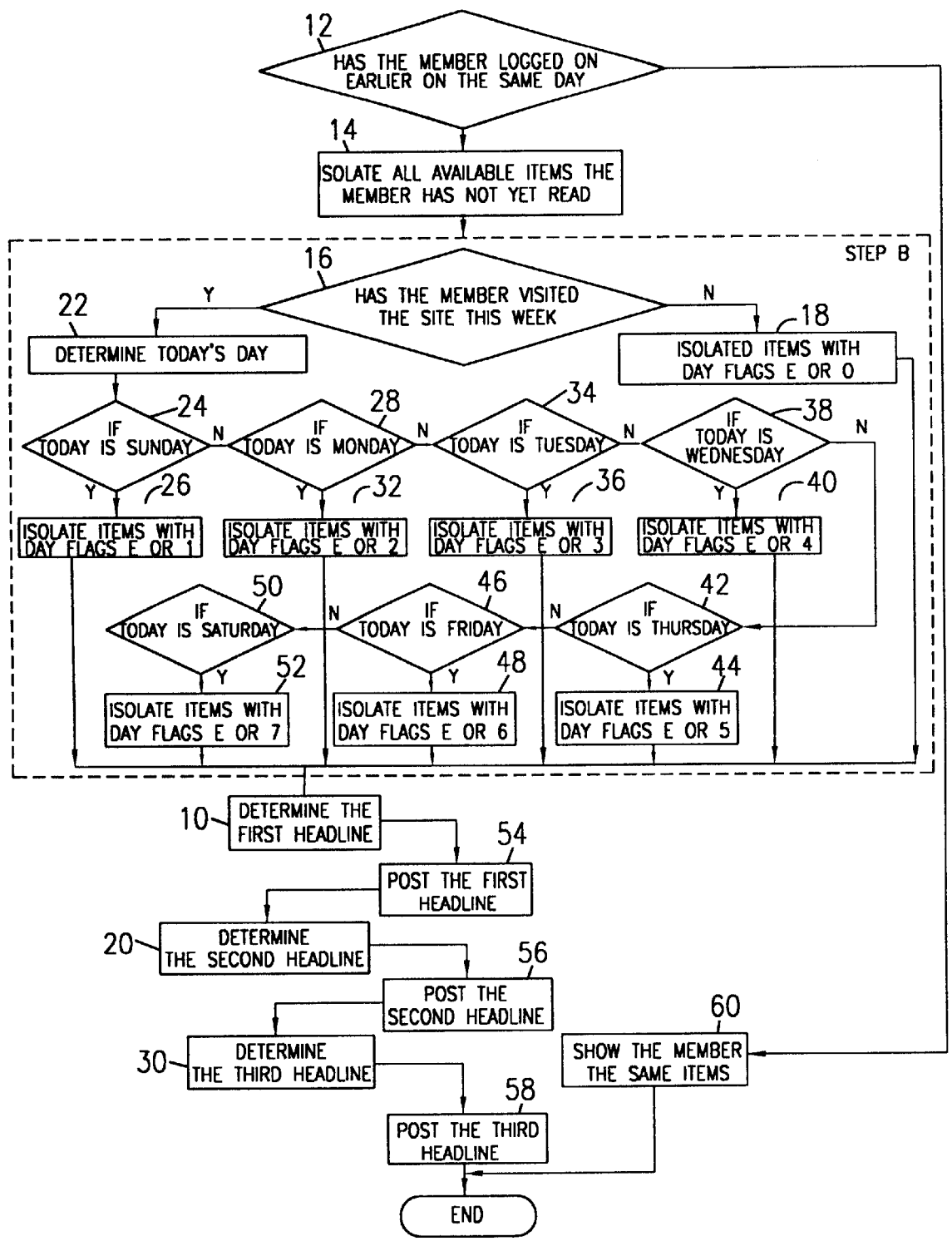
FIG. 1 is a schematic block diagram of the steps to be performed by the posting algorithm while selecting the headlines to be posted on the user's home page.

The following Detailed Description describes the invention in connection with the headline posting algorithm already partially implemented at the HealthScout.com, the web site containing health related materials, and its predecessor RemedyOnline.com. It is to be understood, however, that the described algorithm can be implemented with any Internet database regardless of its content.

When a new member signs on he/she is prompted through a series of screens to develop a member profile. The profile can be simplified, such as selecting several topics of interest from the list pictured in FIG. 4, or a detailed one. To compile a detailed profile, each item in the FIG. 4 is linked to a screen containing several subitems. These subitems are partially shown in FIGS. 5–16. User selects the topics of interest by clicking on the corresponding subitem. Each clicked topic is then stored in the memory of the server as a topic flag, thereby creating a personalized member profile.

Alternatively, the personalized profile can be created from the answers to and results of a health-risk assessment questionnaire, the "7-Minute Checkup", which can be performed at the time of registration. The questionnaire algorithm compares user's answers with stored statistical data and calculates this user's risk with regard to specific health problems. Topic flags associated with the found health problems will be stored in the member's profile. If the check-up indicates an emergency or if the algorithm described hereinafter finds an item that is very important to the member health, the algorithm may sent an alert message to the member via an e-mail or fax. Alternatively, the program may put the alert message to a server's operator instructing the operator to call the member. For these circumstances there can also be a doctor "on-call" capable of helping the member to take proper actions.

Every element of the database, such as articles, newsbytes, features, etc., is evaluated for its content before being stored on the server. During the evaluation such element is assigned a number of flags corresponding to its content. For example, an article about estrogen replacement therapy will get flags ESTR (for estrogen), WMEN (for women's subject matter), BRS (for possible connection to breast cancer), FHOR (for female hormones) and so forth, depending on the content. The sample list of flags with corresponding topics is shown in FIG. 21. There are more than 700 flags that are currently used at HealthScout.com.

Each topic (i.e. flag) is graded (evaluated) on the basis of two factors: importance factor (IF) and rarity factor (RF). The IF is a number from 1 to 9 indicating how important that topic is to the average person's health. The RF is a number from 1 to 9 indicating how rarely the topic would be of personal interest among the general population. Since these criteria are uniform for all data corresponding to one topic, individual elements of data are not reviewed to determine individual IF and RF, rather these factors are automatically assigned to all elements within a particular topic. Other factors may be developed as well as rankings for said factors.

In contrast, a third criterion for analysis—significance factor (SF)—is assigned to a particular element of data. The significance factor (SF) is a number from 1 to 9 indicating how significant is a particular newsbyte or other element itself. The editors assign this factor to each story when it is posted.

Each topic also has a "day rating". The "day rating" refers to the day of the week on which a particular topic (flag) is checked by the posting algorithm. "E" means the flag is checked every day; "0" means it is checked on the first log-on of the week; and "1" through "7" mean it is checked only on Sunday, Monday, Tuesday, Wednesday, Thursday, Friday, and Saturday respectively.

Consequently, each element of data has four values attached to it: the IF, RF and the "day rating" corresponding to the topic, and the SF corresponding to the element itself. Each of these values can be a one-byte symbol or any other byte-value simbol to which the flag or the individual element of data within the flag can be set. "Blank" is also a valid setting in each case. These are the customizing data that the algorithm looks at when deciding which headlines to post.

Referring to FIG. 1, the process of selecting the headlines involves several steps performed by the algorithm. As shown in block 12, the first step performed by the algorithm is to determine whether this particular member has already logged on earlier on this same day. To enable this step to be performed, the server maintaines a record of the time spent on the site for each individual member. If the record shows that the member visited the site previously on the same day the algorithm will post the same headlines the member saw before, block 60.

If, however, the record shows that the member hasn't logged on earlier on this day, the algorithm will perform step 14, which is to isolate all assets on the site that the member has not yet seen (i.e. clicked on). The step is done to ensure that the member does not see the same element of data twice.

Using the same record, the algorithm next determines whether the member visited the site on an earlier day in this calendar week, block 16. If he has not, the algorithm will isolate all of the remaining assets whose "day ratings" are either E or 0, block 18. Those are usually the most important or most interesting topics for this particular calendar week. Otherwise (block 22), the algorithm will determine the today's date, using the internal calendar, and isolate all of the remaining assets whose day flags are either E or 1 if today is Sunday (blocks 24 and 26), E or 2 if today is Monday (blocks 28 and 32), E or 3 if today is Tuesday (blocks 34 and 36), E or 4 if today is Wednesday (blocks 38 and 40), E or 5 if today is Thursday (blocks 42 and 44), E or 6 if today is Friday (blocks 46 and 48), or E or 7 if today is Saturday (blocks 50 and 52). Out of the isolated items, the algorithm will pick the individual headlines for the member. The above described series of steps, designated as Step B in FIG. 1, can be skipped altogether if capabilities of the server allow for searching the entire database.

Figure 2:
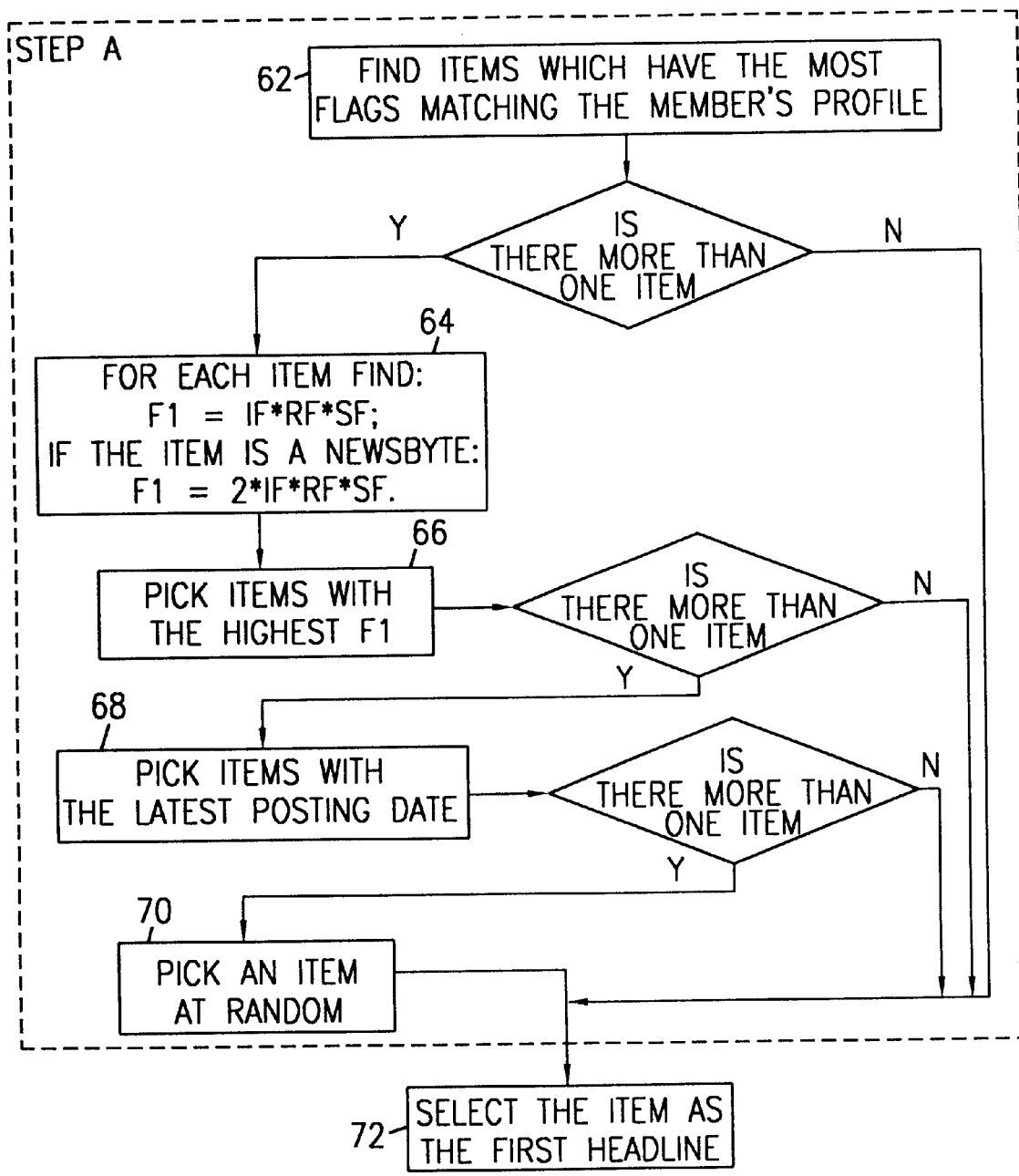
FIG. 2 is a schematic block diagram of the steps to be performed by the posting algorithm within the block 10 in FIG. 1, while searching for the first headline.
Figure 3:
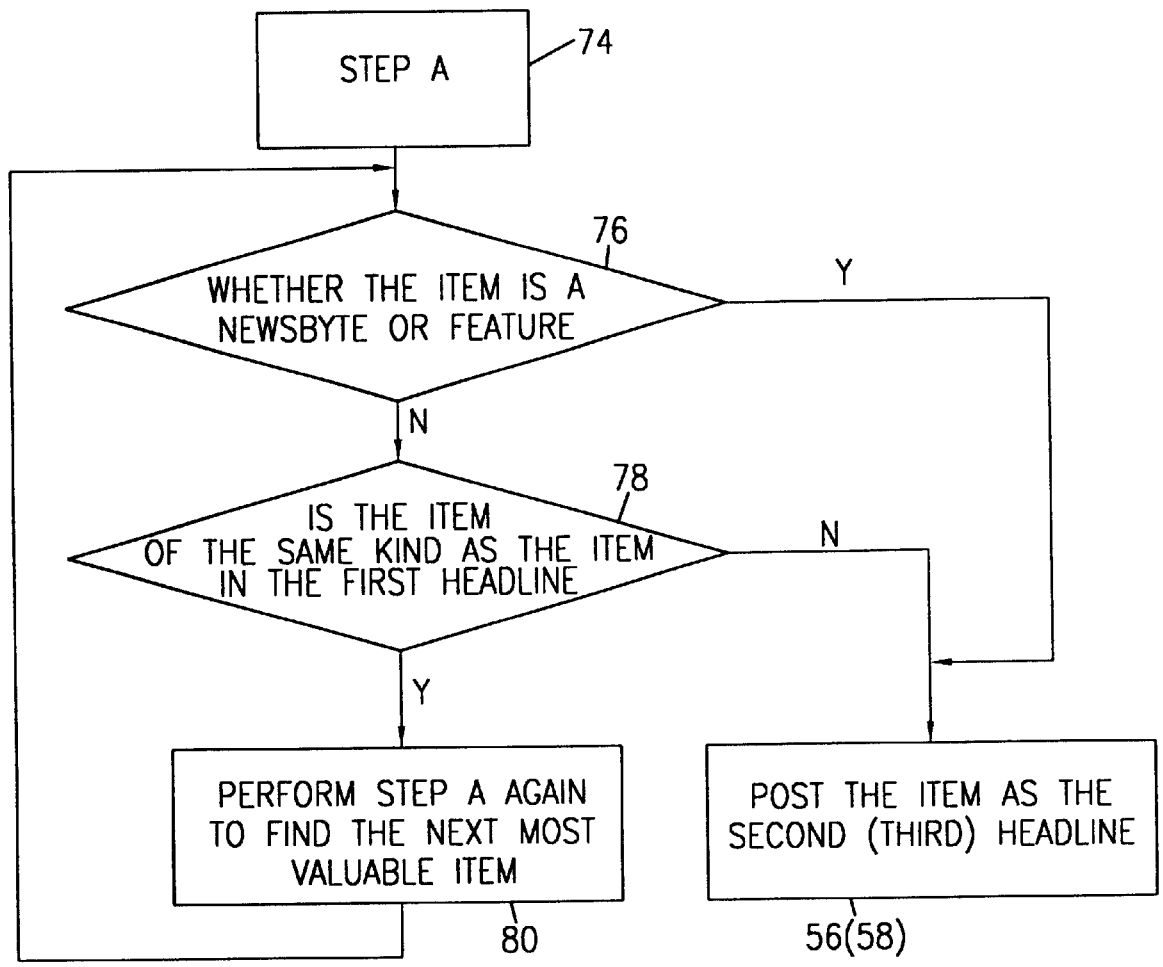
FIG. 3 is a schematic block diagram of the steps to be performed by the posting algorithm within blocks 20 and 30 in FIG. 1, while searching for the second and the third headline.
Figure 5:
Figure 6:
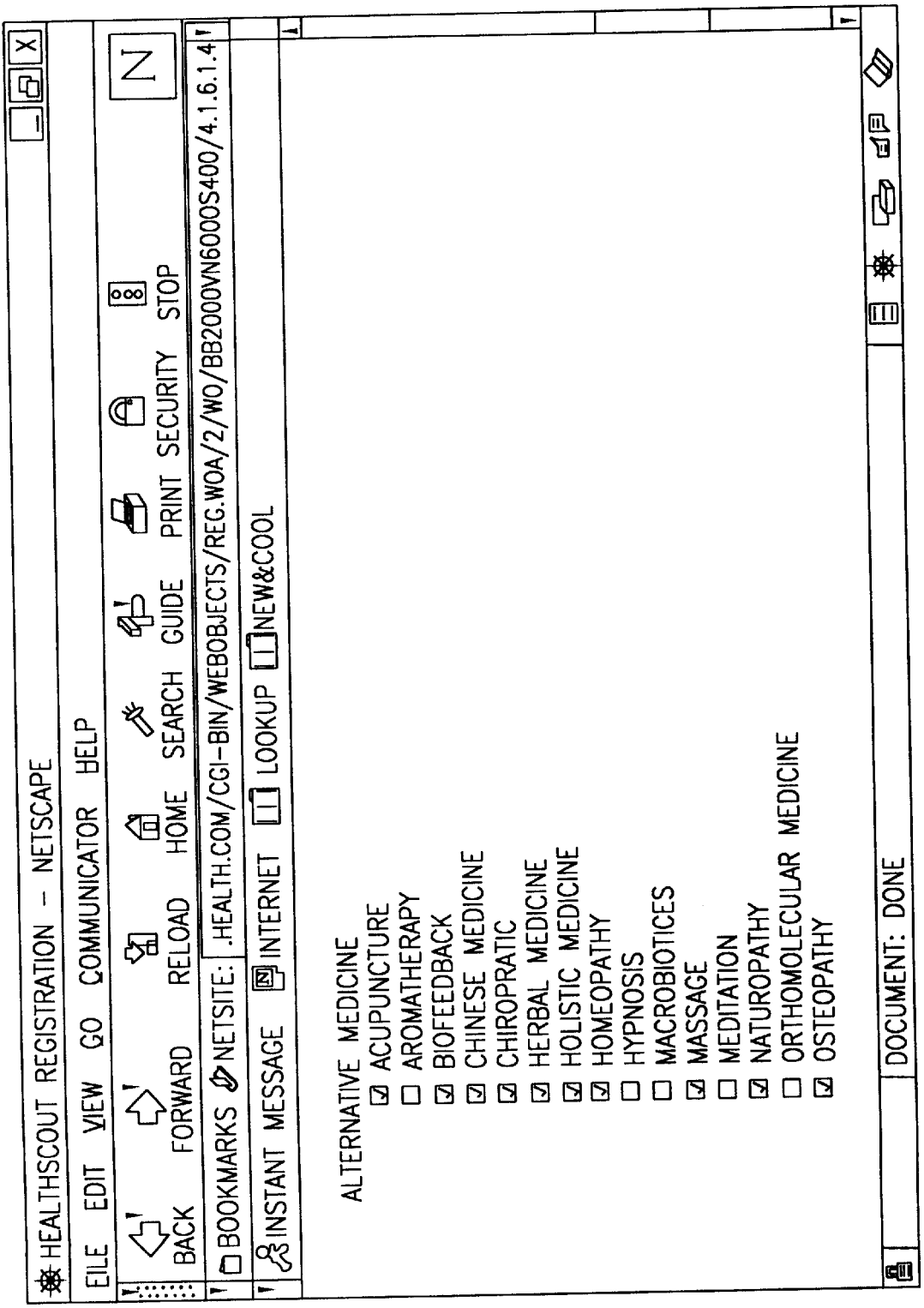
Figure 8:
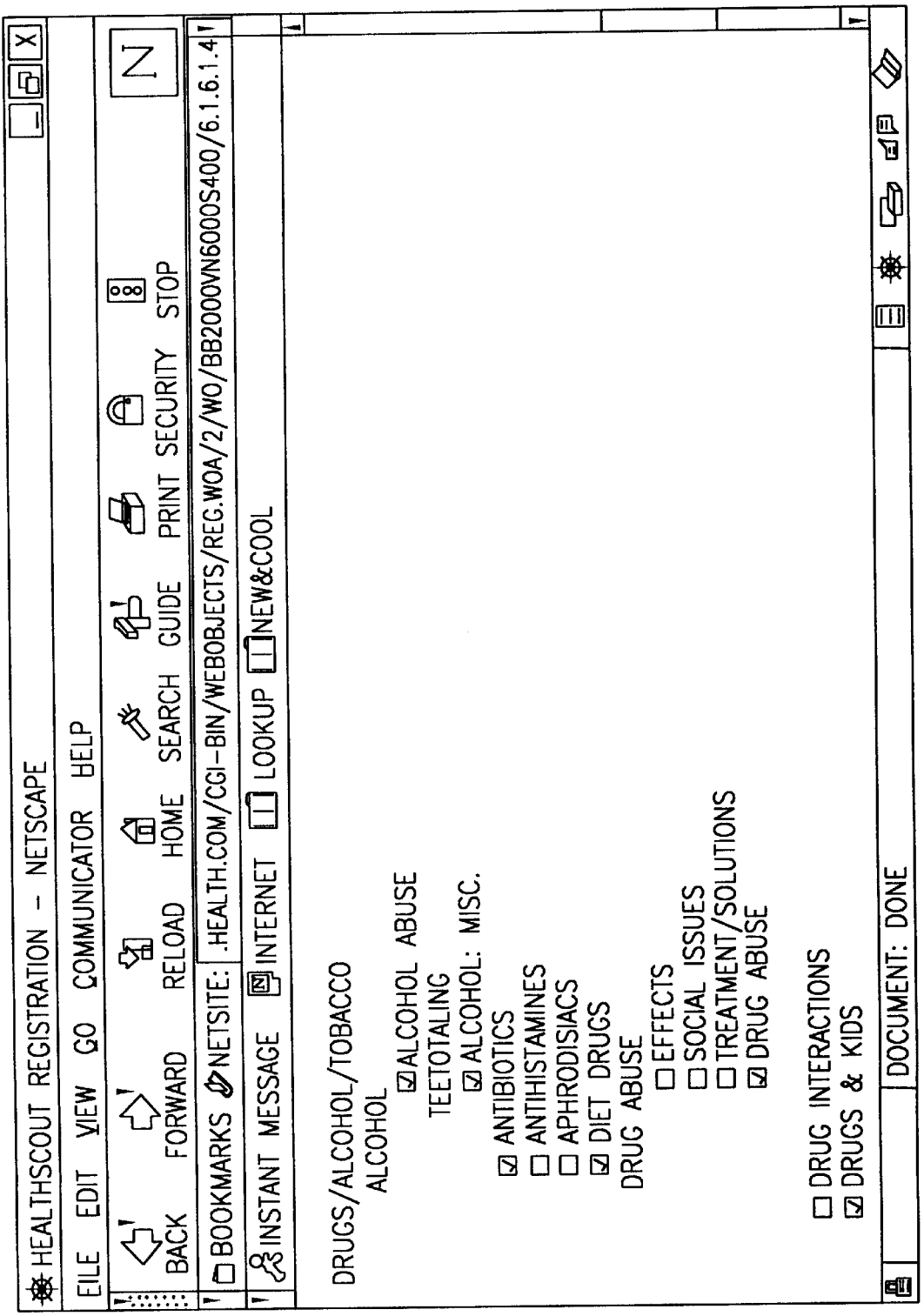
Figure 11:
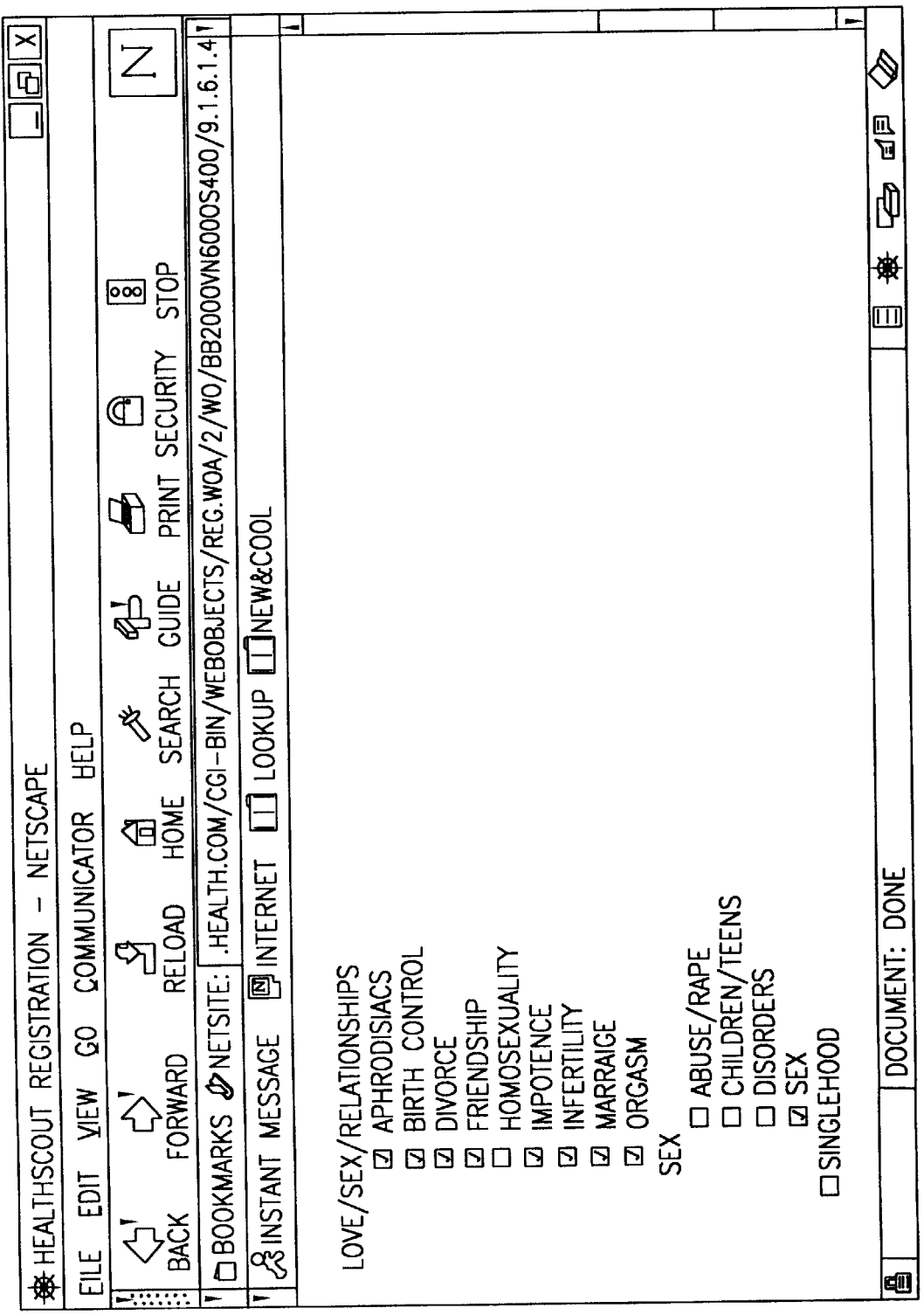
Figure 12:
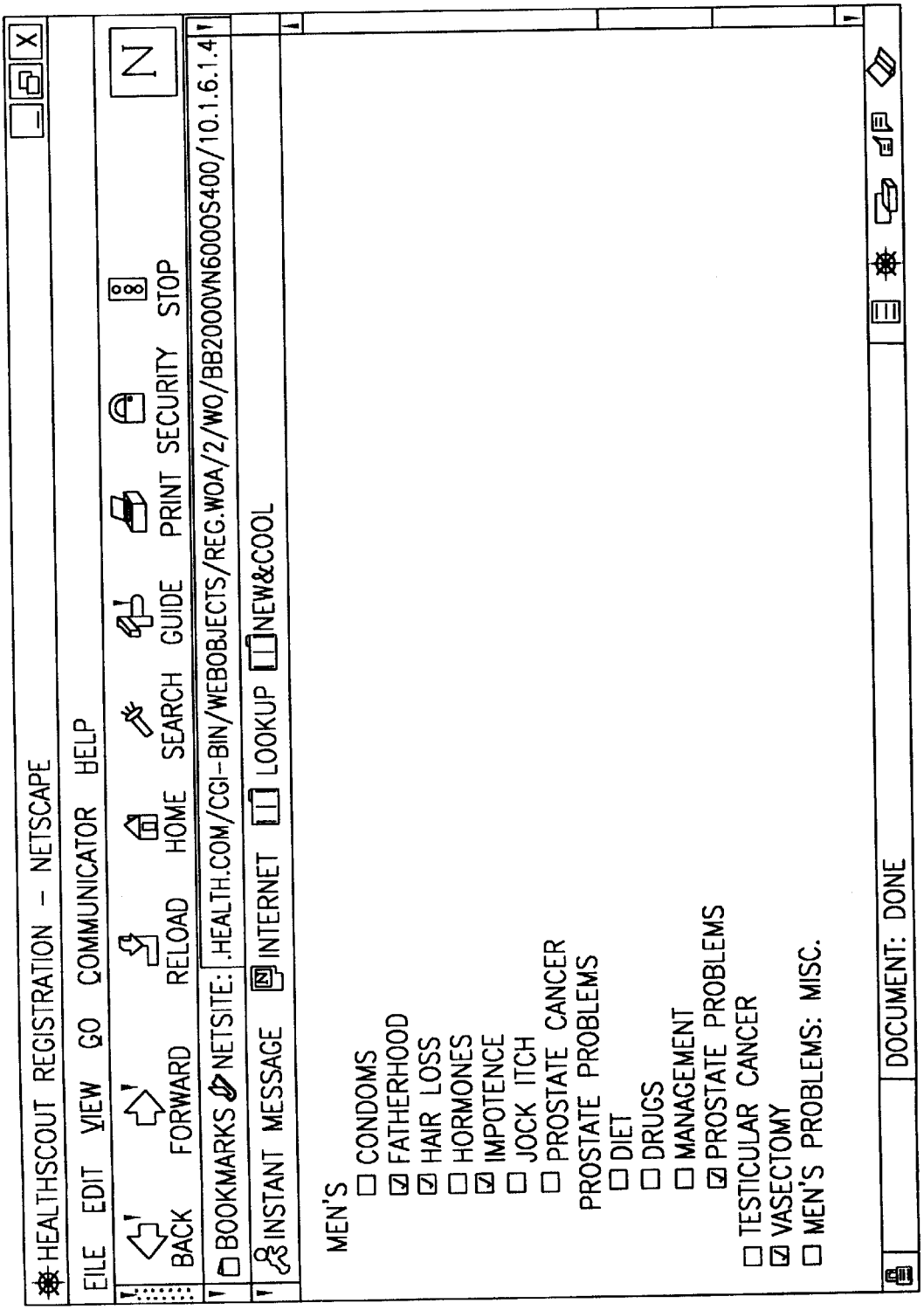
Figure 13:
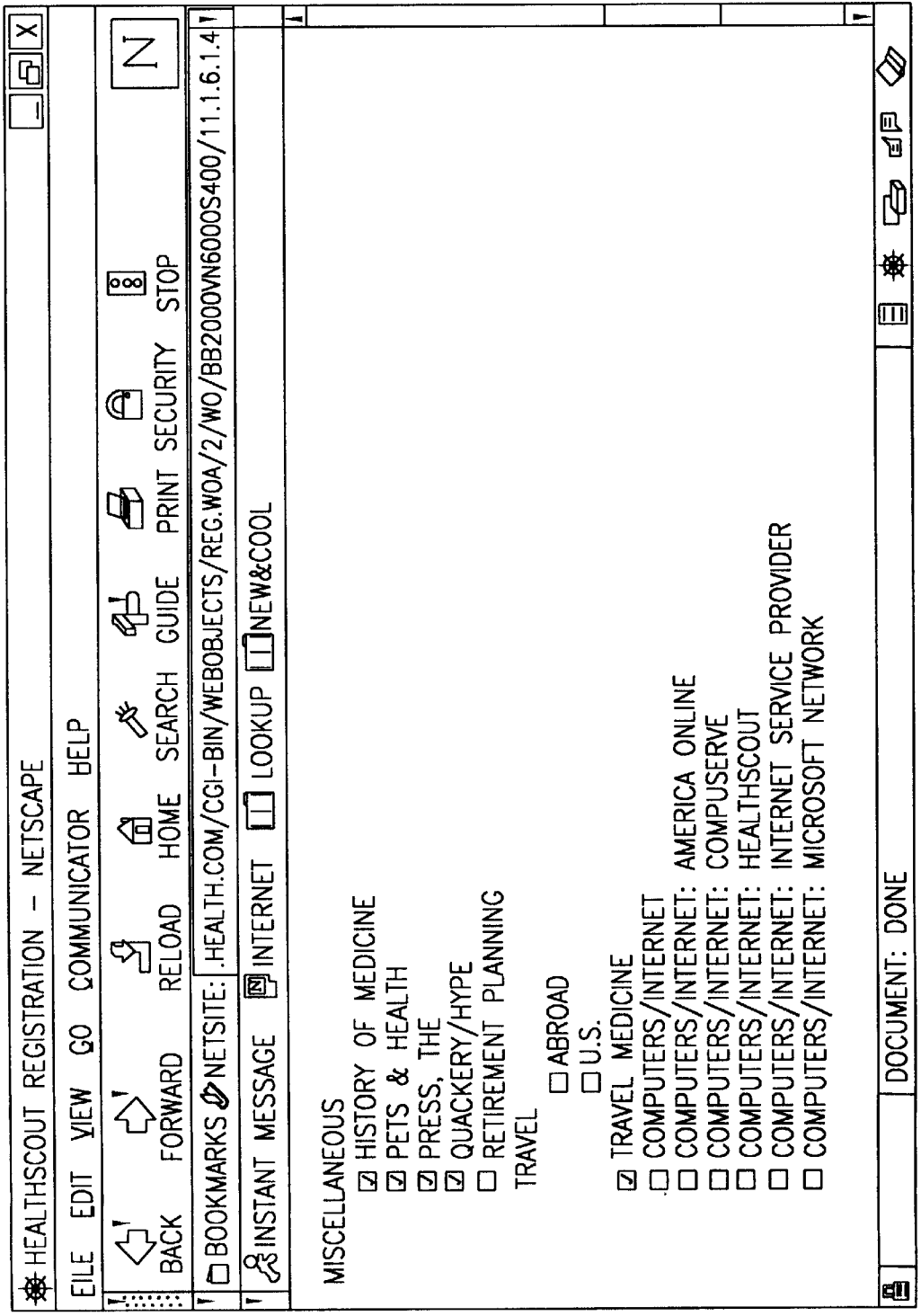
Figure 14:
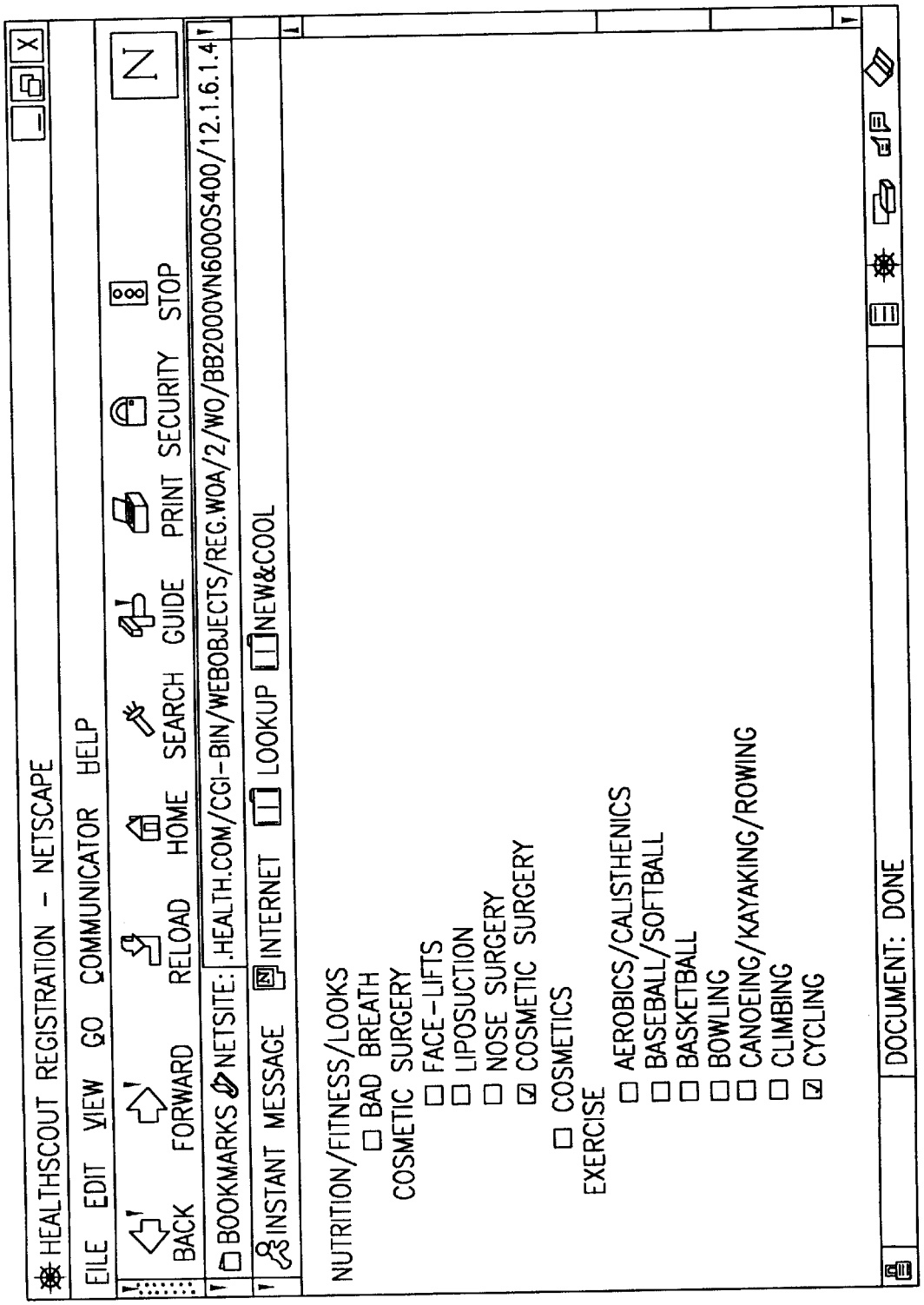

For a more convenient presentation, the steps to be performed by the algorithm within blocks 10, 20 and 30 in FIG. 1, are shown separately in FIGS. 2 and 3. FIG. 2 shows steps to be performed in determination of the first headline to be posted. Finding of the second and third headline will involve some of the same steps, grouped together as Step A in FIGS. 2 and 3, and also some additional steps, as shown in FIG. 3.

As shown in FIG. 2 to determine which headline should be posted first, the algorithm will first find items within the database which have the most flags matching the flags in the member's profile, block 62. If there is only one such item, it will be immediately selected and posted as the first headline, blocks 72 and 54 (FIG. 1) respectively. If, however, there is a tie among several items, the algorithm will multiply the IF, RF and SF for each item and compare the products of the multiplication (designated as F1 in block 64). The algorithm will double the result if the item is a newsbyte. The algorithm will choose the item that yields the higher product, block 66. It is possible to change the above described formula in accordance with specific needs of the server.

If there is still a tie after block 66, the algorithm will compare the posting dates for each item and choose the one whose posting date is later, block 68. If there is still a tie, the program will pick the headline at random, block 70. The selected item is then displayed as the member's first headline, block 54, FIG. 1.

All of the steps described above for selecting the first headline, except block 72, will be repeated by the algorithm in the process of determining the second and third headline, blocks 20 and 30 respectively in FIG. 1. Therefore, for simplicity they are grouped together in FIGS. 2 and 3 as Step A, block 74. After finding the first headline the algorithm will perform the Step A again to find the next most valuable item. If it is a newsbyte or a feature, the program will post it as the second headline, blocks 76 and 56. If it is not a newsbyte or a feature, it will be posted only if it is not the same kind of item as the top headline, block 78. For example, the algorithm will not post two drug reports. If the item is of the same kind, the algorithm will perform Step A again to determine the next most valuable item, block 80, and repeat steps in blocks 76 and 78 until it will find a postable item. Found item will be displayed as the second headline, block 56. To find third headline, all of the steps described with respect to the second headline will be repeated and the result posted for the member (block 58). The personalized screen with headlines selected for the particular member under the title "Your Headlines" is shown in FIG. 17.

As a result of the described data manipulation, the user will receive a limited number of data elements which are specifically tailored to this user's interests and needs. The number of displayed items may vary, however, the algorithm for selecting additional headlines will be the same as for selecting the second and the third headlines above.

There are additional ways for the algorithm to select the headlines. On each article detail page, beside every article there is a "Rate This Article" button linked to a dialog box that invites the member to rate the article for usefulness, ease of reading and overall quality. The data collected from members in this dialog box will be used to give the algorithm a deeper understanding of members' preferences and enable it to serve up more welcome headlines. When the algorithm faces a choice between two articles that would otherwise score equally well against the user's profile, for example, it will automatically prefer the article that has scored higher with other users.

The server is keeping a record of all the articles that each member clicks on and presumably reads. When the algorithm faces a choice between two articles that would otherwise score equally well against the user's profile, it will automatically prefer the article whose flag set most closely matches those of previous articles he has clicked on.

It is also possible to apply an objective test (such as Gunning's Fog Index or the Flesch Index) to measure the readability of each article in the database. Members will occasionally use "Rate This Article" to express how easy they found an article to read. By matching a member's readability ratings with the objective ratings of the same articles, the algorithm will arrive at a preferred index for each member. Whenever the algorithm faces a choice between two articles that would otherwise score equally well against the user's profile, it will automatically prefer the article whose readability index most closely matches that preferred by the member.

It is also possible to add a special flag to each article indicating how knowledgeable about its main topic a reader would have to be in order to find the article too elementary and repetitive of facts that he or she already knows. When the algorithm looks at all of the new (never clicked on) items that would otherwise score high enough against the user's profile to merit display in the "Your Headlines," it will discard those that are too elementary.

In addition to the personalized Member Front Page, the server offers the Guest Front Page. This page is not customized; every user sees the same headlines. At the top of the page are today's top three headlines, which the editors will decide each day. Unlike the headlines in the Your Headlines section of the Member Home-Page, which can be newsbytes or features or any of several other customizable elements of the database, the headlines on the Guest Home Page will nearly always be newsbytes. All three headlines will have graphics attached: either icons or unique art.

Clicking either the "More News" button on either home page or the "News" or "Other News" listing on the guest or member navigation-bar, respectively, will open the Week's News Page. There all of the week's newsbytes will displayed, grouped by posting date (with a header listing the date) and alphabetized by headline within each posting date. These links may have no art attached.

Each week, editors may decide which two or more features should receive prominent display at the top of the Feature Index Page. Those two may have art attached. Underneath them will come a list of all remaining features on the site, grouped in an alphabetical list of feature categories and arranged alphabetically by headline within each category. The number and names of the categories will change over time as new ones are added, old ones are removed, new and old ones are consolidated, etc. Headlines in this part of the page may have no art attached, except for "New" bursts that the editors can attach by activating a flag and remove by switching the flag off.

Besides filtering the contents of one database located on the server, the algorithm can also look at the articles on any other Web site chosen by the member and pick items most appropriate to the member's personal interests. It will do this by applying both keyword and concept analysis to the target site's articles in order to infer which of the topic flags they should have attached to them, and then using the previously described parts of the algorithm to decide which articles to display in personal headlines section.

It is also possible to make the algorithm continually comb the entire Web for the articles of greatest personal interest to the member. The algorithm will then combine "spidering" technology, currently used by the global search engine software, with keyword and concept analysis. At this point, the server will be functioning as an autonomous personal agent, applying artificial intelligence to select the most pertinent items from all over the Web, without any real-time direction from its user.

In addition to the above described services, the server can also store medical encyclopedias and search them at member's request. It can also provide information about physicians and drugs, as well as links to other health information resources on the Internet.

Figure 18:
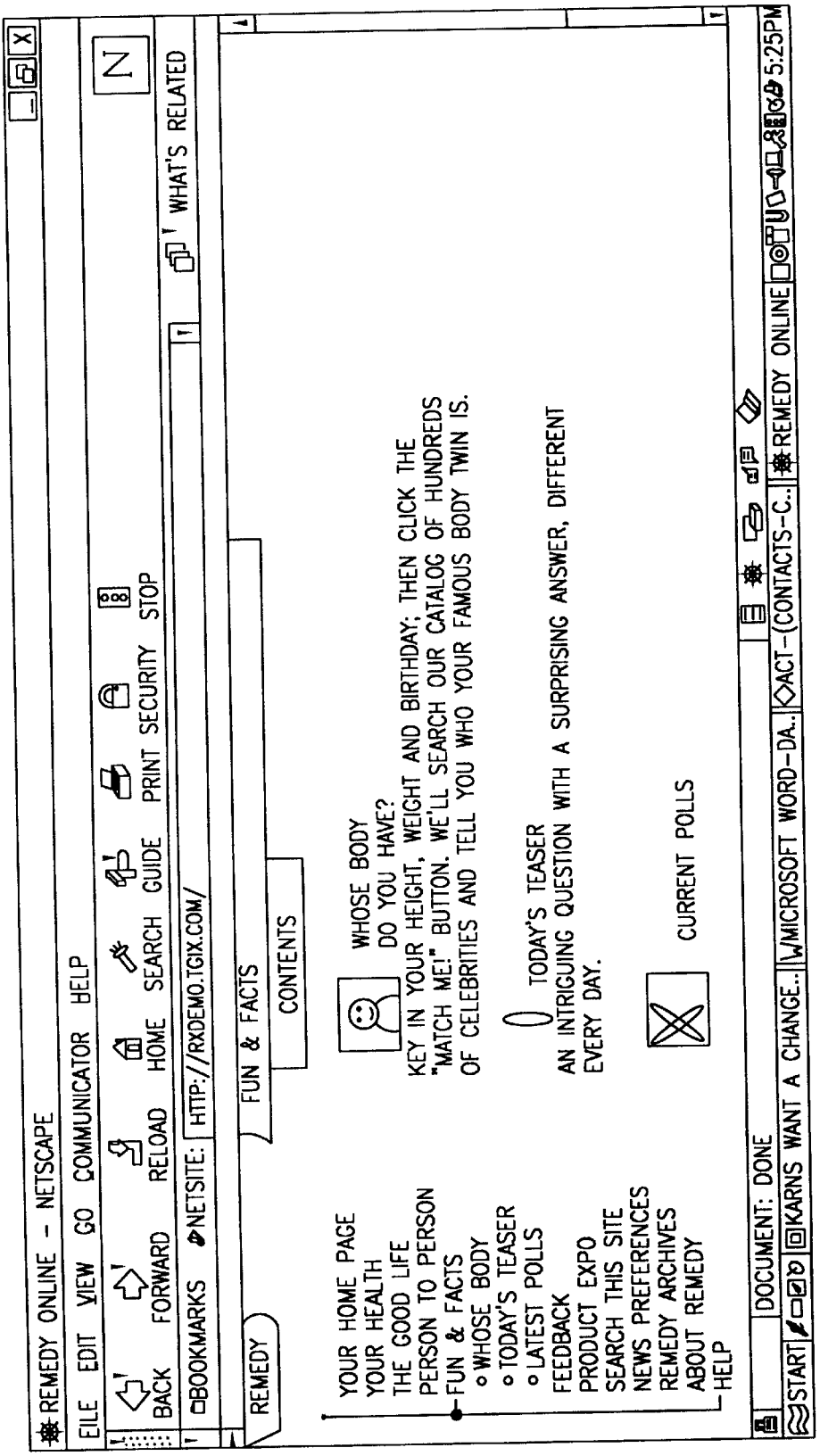
FIG. 18 is the screen showing the "Whose Body Do You Have" button.
Figure 19:
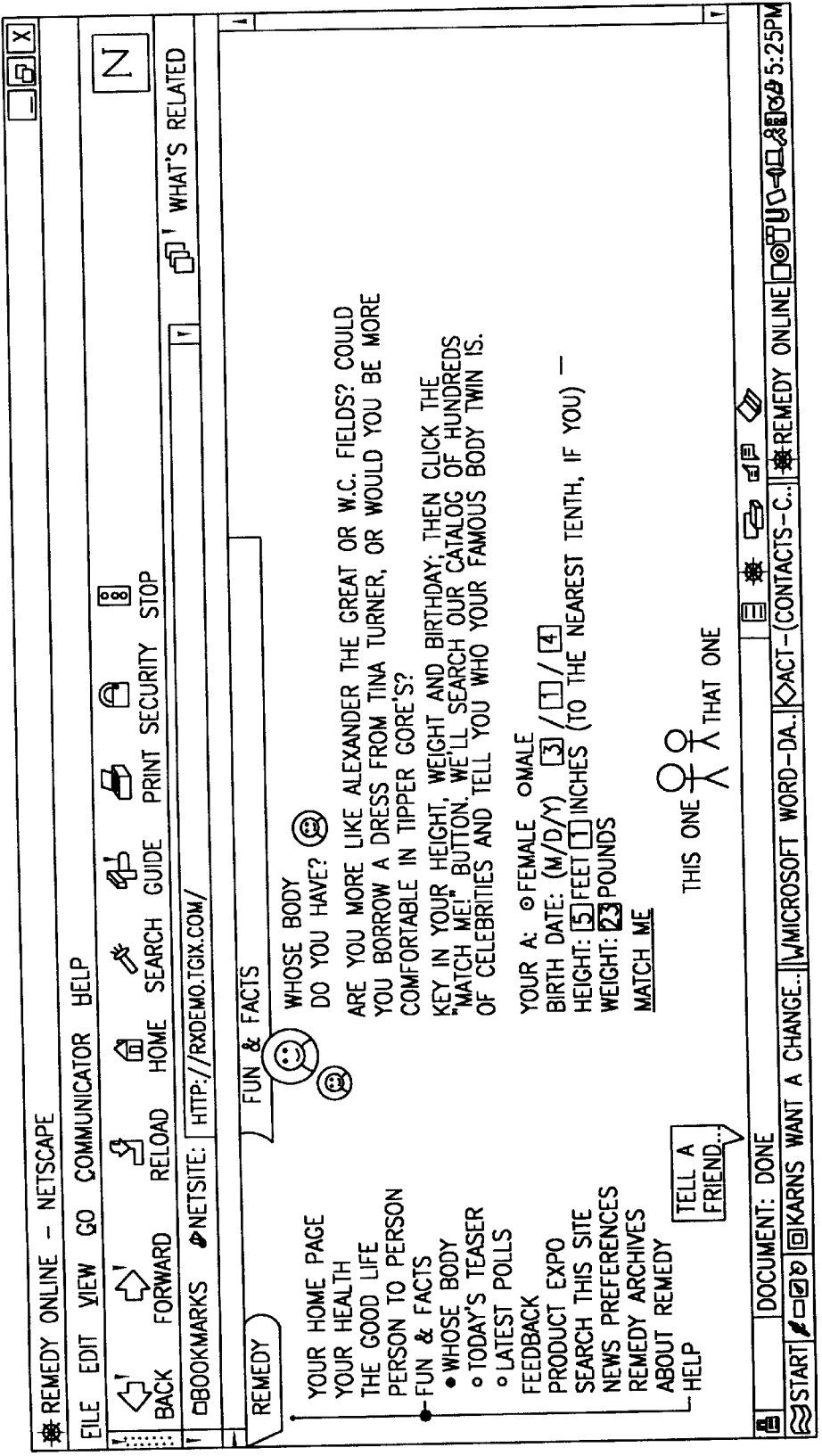
FIG. 19 is the screen showing the dialog box that the user has to fill out to allow the algorithm to find the user's "body twin"
Figure 20:
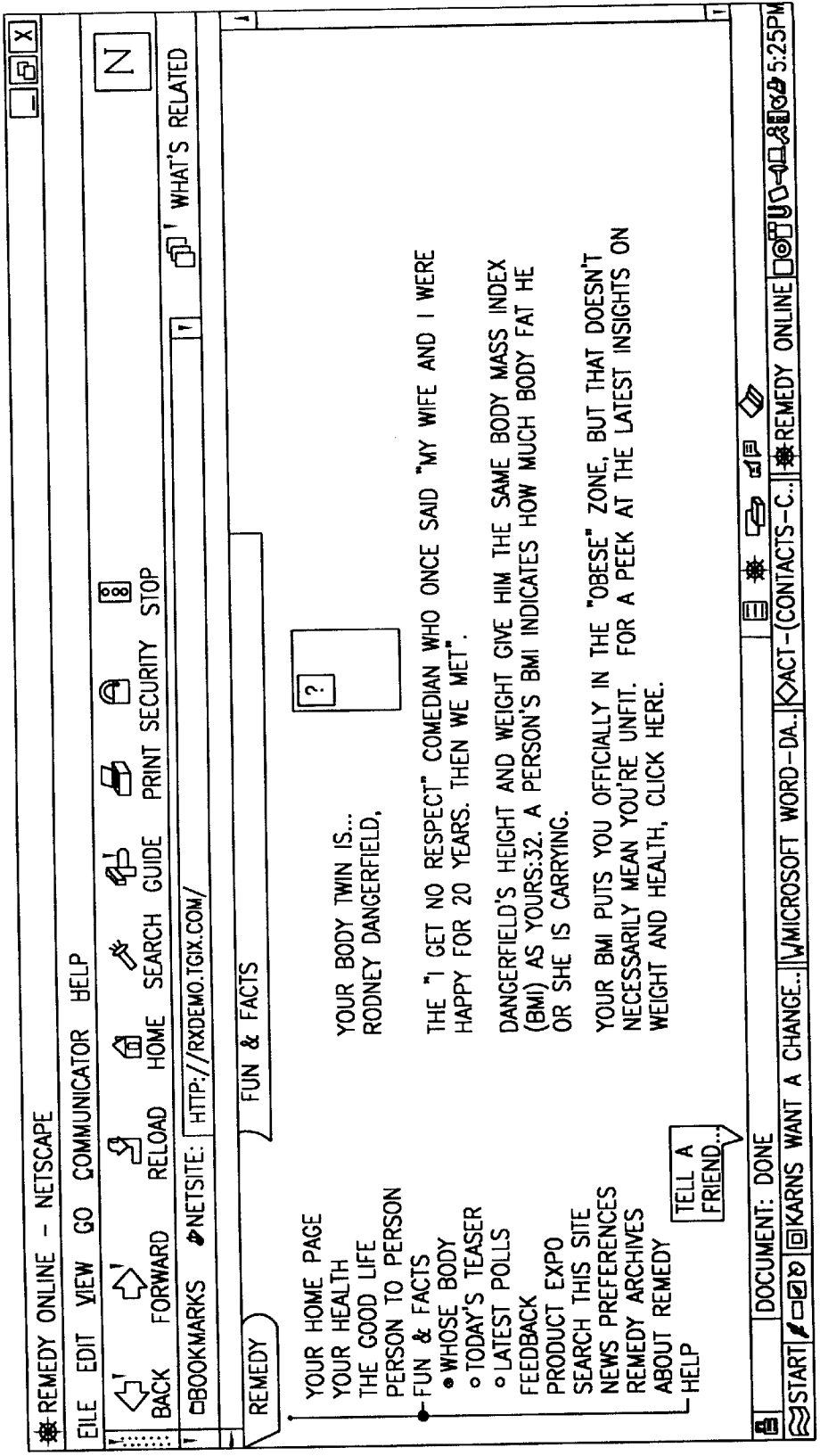
FIG. 20 is the screen showing the user his or hers "body twin;"
Figure 25:
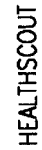
Figure 29:
Figure 31:
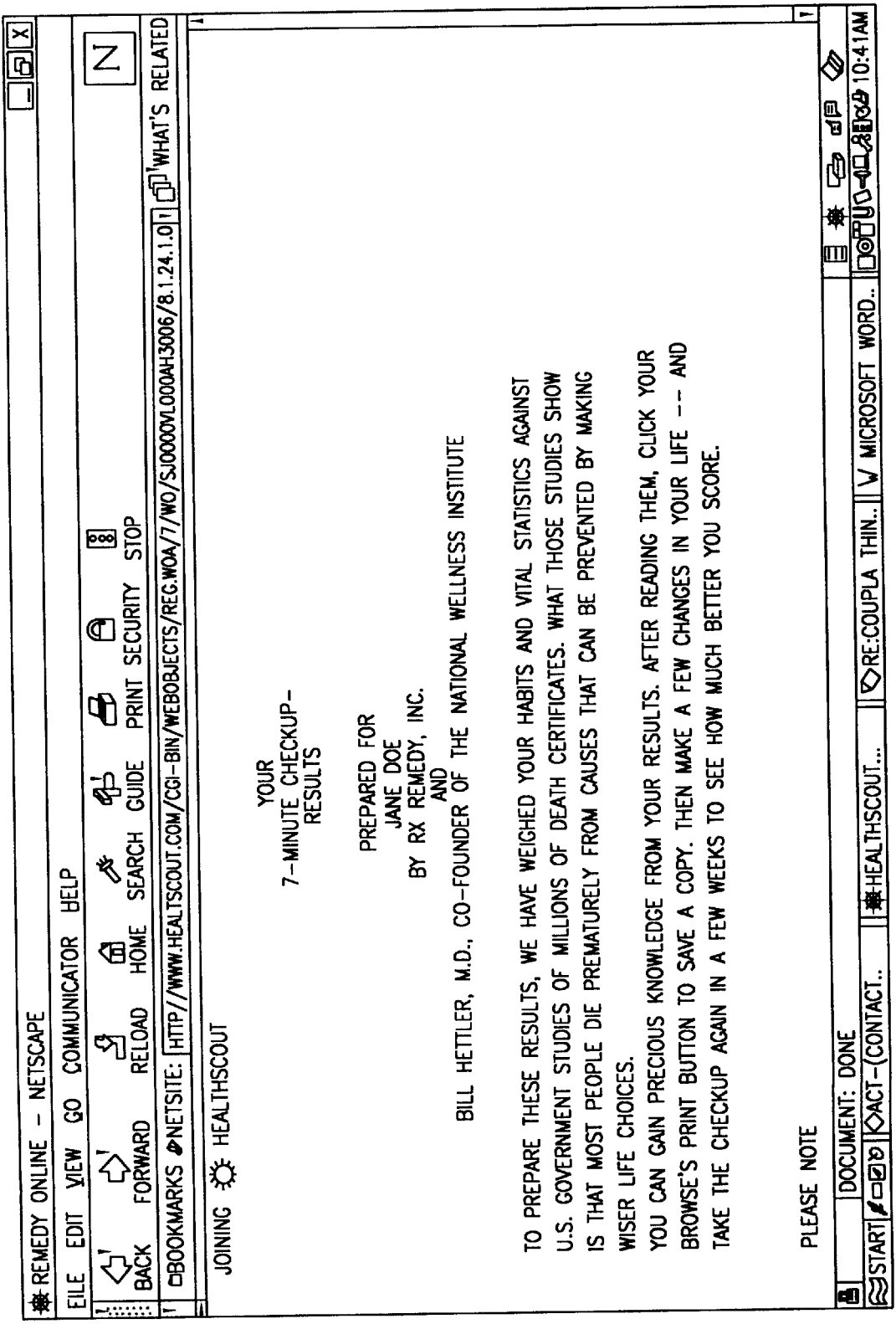
Figure 32:
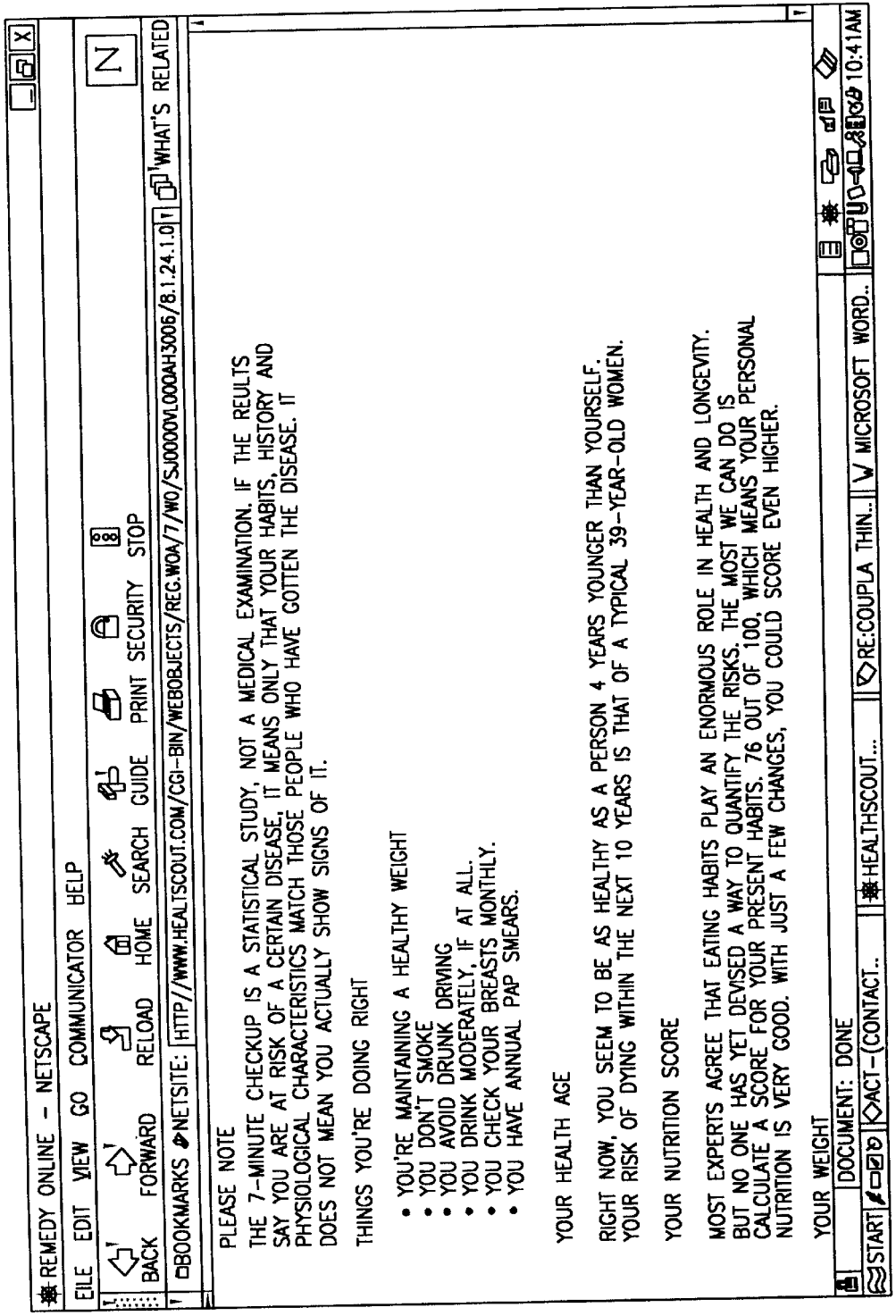

As entertainment, the server may also find a celebrity "body twin" for the user. When the user will click on "Whose Body Do You Have" button, FIG. 18, the dialog screen will appear asking the user to enter the gender, date of birth, weight and height and then to click on "Match Me" button, FIG. 19. To find the "body twin" the algorithm will calculate the user's BMI and round it to the nearest whole number. BMI=(weight in kilograms)/(height in meters)$^2$. It will then isolate every celebrity in the database who has the same gender and body type as the user and, from that group, isolate all who share the user's BMI. If none do, it will isolate the group whose BMI is closest to the user's. If there's a tie, the algorithm will isolate the larger of the two groups. The next step is to isolate from that group all who share the user's birthday (irrespective of birth year). If there are none who share the user's birthday, the algorithm will then isolate all who share the user's zodiacal sign. If there are none who share the user's zodiacal sign, it will then keep this whole group. From the last resulting group, the algorithm will pick the celebrity whose birth year is closest to the user's. If there's a tie, it will pick the one whose first name is first in the database alphabetically. The found celebrity's name and biographical information will appear on the user's screen as shown in FIG. 20.

To provide a more complete health service to the user, it is also possible to implement a Home Eye Exam on the same server by including a link to an Eye Exam page on the Member Front Page. During the Home Eye Exam the user will be able to determine whether his or her vision has become worse since the last check-up and whether the new prescription is needed. The actual eye-exam is performed using a regular E-chart, shown in FIG. 22. However, to provide accurate results the E-chart must first be adapted to the user's screen. Therefore, as the user will click on Home Eye Exam button, a black square and a dialog box shown in FIG. 23 will appear on the screen. Measurements of the square on the user's screen will be used by the algorithm to determine proper parameters of the E-chart which will be displayed on the same screen. The square is sized so that an average monitor, probably a 14-inch with 640-by-480 resolution, will display the square as one inch wide. This should make the largest likely square (on a 20-inch monitor at 640-by-480 resolution) just over 1⅜ inches wide and the smallest likely (on a 14-inch at 1024-by-768) about ⅝ inches wide.

Meanwhile, the "E" chart is scaled for viewing at 10 feet when the black square is one inch wide. This means that when the black square is an inch wide on the screen, the Es on the chart should be of the following widths on the screen: For 20/100 vision, 56/64 or ⅞ inch; for 20/70 vision, 39/64 inch; for 20/40 vision, 22/64 or 11/32 inch; for 20/30 vision, 16/64 or ¼ inch; for 20/20 vision, 11/64 inch; for 20/15 vision, 8/64 or ⅛ inch. In addition, if there is room on the screen it is possible also to add a set of Es for 20/10 vision. These would each be 6/64 inch wide.

Finally, all the viewing distances for the test should be made directly proportional to the size of the black square on the user's monitor. Clicking the "1 inch" radio button should insert "10 feet 0 inches" in the boxes 82 in FIG. 23; clicking "⅝" should insert "6 feet 3 inches;" clicking "¾" should insert "7 feet 6 inches;" clicking "⅞" should insert "8 feet 9 inches;" clicking "1⅛" should insert "11 feet 3 inches;" clicking "1¼" should insert "12 feet 6 inches;" clicking "1⅜" should insert "13 feet 9 inches;" and clicking "1½" should insert "15 feet 0 inches."

These preparations will insure that the smallest group of Es on the E-chart in which the user can orient at least half of the Es will indicate the sharpness of his or her vision. The procedure for performing the eye-exam is known to most users and will appear on the users' screens for their reference.

Figure 35:
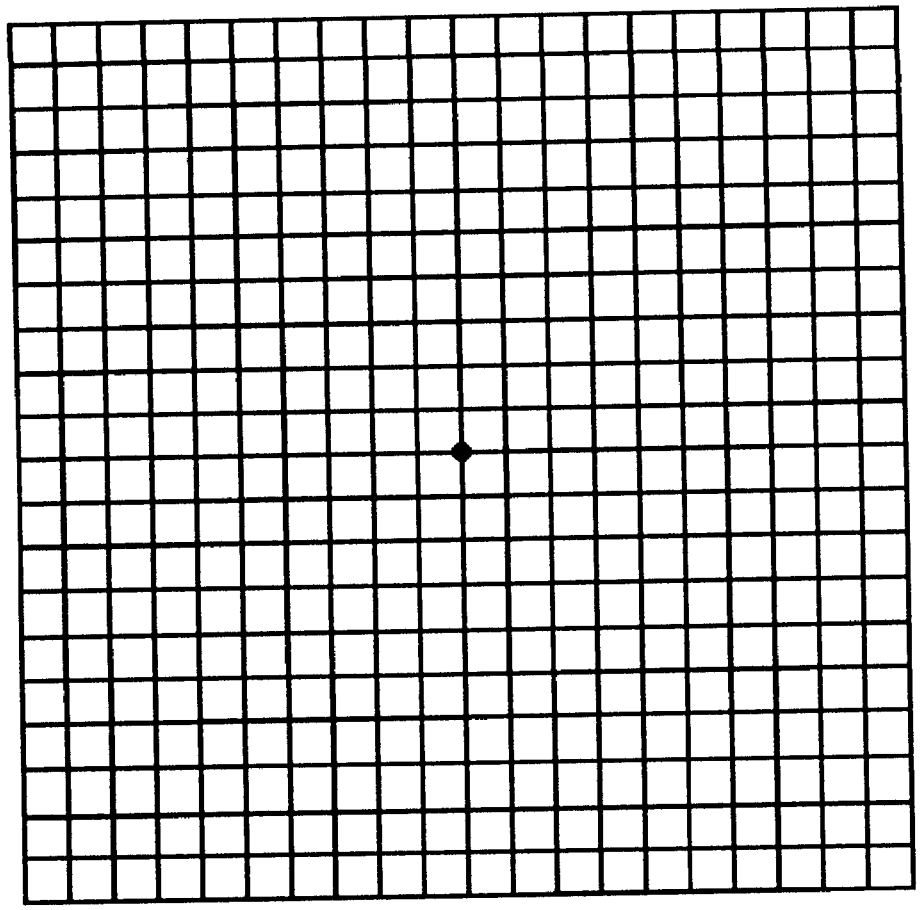
FIG. 35 is the Amsler Greed used to test for macular degeneration.

The E-chart test described above is typically used to find problems with distance vision. The same preparations, however, can be used to find other vision problems such as presbyopia, macular degeneration or amblyopia. The same E-chart can be used to test for amblyopia. The test called the Amsler Grid, shown in FIG. 35, is typically used to detect macular degeneration. Although it is shown in black-on-white, the Amsler Grid should be displayed on the user's screen as white-on-black, and the entire background around the grid should be black. This is to make the test more accurate for people who have cataracts, by lessening the effects of glare. On the user's monitor, the Amsler Grid should be about four inches square. This means there should be four different grids: one to be displayed if the user has clicked on "⅝" for the width of the black square on page 2; the others to be displayed if the user has clicked on "⅞," "1⅛" or "1⅜." To test the user for presbyopia, the algorithm can direct the user to read a passage on the screen and see if it causes a strain in the eyes. The passage should be rendered in a type size whose capitals are 0.13 times the height that was determined for the Es in the 20/30 group.

Having described this invention with regard to specific embodiments, it is to be understood that the description is not meant as a limitation since further variations or modifications may be apparent or may suggest themselves to those skilled in the art. It is intended that the present application cover such variations and modifications as fall within the scope of the appended claims.

I claim as follows:

1. A method of selecting and presenting to a user of personalized data elements out of the database stored on an Internet server, comprising the steps of:

obtaining personal information from said user identifying topics of interest of said user;

storing said personal information on said Internet server as a personal user profile;

selecting a specific segment of said database which is to be searched for desired data elements;

selecting a predetermined number of said data elements from said selected segment of said database, ranked in accordance with said personal profile obtained from said user;

posting said selected database elements directly to a user's home page in ranked order for said user's view.

2. A method of selecting and presenting to a user of personalized data elements out of the database stored on an Internet server, according to claim 1, wherein said step of selecting a predetermined number of said data elements from said selected segment further comprises the step of selecting at least one of said predetermined number of data elements which match said topics of interest of said user.

3. A method of selecting and presenting to a user of personalized data elements out of the database stored on an Internet server, according to claim 1, wherein each of said data elements within said database is assigned a plurality of factors each of which is given a value.

4. A method of selecting and presenting to a user of personalized data elements out of the database stored on an Internet server, according to claim 3, wherein said step of selecting a predetermined number of said data elements from said selected segment further comprises the step of selecting at least one of said predetermined number of data elements for which the product of said assigned factors is the greatest.

5. A method of selecting and presenting to a user of personalized data elements out of the database stored on an Internet server, according to claim 1, wherein said step of selecting a predetermined number of said data elements from said selected segment further comprises the step of selecting at least one of said predetermined number of data elements with the latest date of being downloaded to said server.

6. A method of selecting and presenting to a user of personalized data elements out of the database stored on an Internet server, according to claim 1, wherein said step of selecting a predetermined number of said data elements from said selected segment further comprises the step of selecting at least one of said predetermined number of data elements at random.

7. A method of selecting and presenting to a user of personalized data elements out of the database stored on an Internet server, according to claim 1, wherein said segment of said database which is to be searched comprises all data elements which said user has not seen before.

8. A method of selecting and presenting to a user of personalized data elements out of the database stored on an Internet server, according to claim 1, wherein said segment of said database which is to be search comprises data elements specified for a particular day of the week.

9. A method of selecting and presenting to a user of personalized data elements out of the database stored on an Internet server, according to claim 1, wherein selected data elements are the same as said user saw earlier if said user logged on to said server previously on the same day.

10. A method of selecting and presenting to a user of personalized data elements out of the database stored on an Internet server, according to claim 1, wherein said step of obtaining personal information from said user further comprises performing an on-line check-up.

11. A method of selecting and presenting to a user of personalized data elements out of the database stored on an Internet server, according to claim 1 further comprising a step of assigning a rating to said data element by said user.

12. A method of selecting and presenting to a user of personalized data elements out of the database stored on an Internet server, according to claim 11, wherein said step of selecting a predetermined number of said data elements from said selected segment further comprises the step of selecting at least one of said predetermined number of data elements for which said rating by said user is the highest.

13. A method of selecting and presenting to a user of personalized data elements out of the database stored on an Internet server, according to claim 1 further comprising a step of recording topics of all data elements that said user selected by clicking.

14. A method of selecting and presenting to a user of personalized data elements out of the database stored on an Internet server, according to claim 13, wherein said step of selecting a predetermined number of said data elements from said selected segment further comprises the step of selecting at least one of said predetermined number of data elements which has the highest number of topics matching with said recorded topics of previously selected data elements.

15. A method of selecting and presenting to a user of personalized data elements out of the database stored on an Internet server, according to claim 1 further comprising a step of evaluating a readability index of said user.

16. A method of selecting and presenting to a user of personalized data elements out of the database stored on an Internet server, according to claim 15, wherein said step of selecting a predetermined number of said data elements from said selected segment further comprises the step of selecting at least one of said predetermined number of data elements which most closely matches said readability index of said user.

17. A method of selecting and presenting to a user of personalized data elements out of the database stored on an Internet server, according to claim 1 further comprising the step of evaluating a degree of knowledge of said user.

18. A method of selecting and presenting to a user of personalized data elements out of the database stored on an Internet server, according to claim 17, wherein said step of selecting a predetermined number of said data elements from said selected segment further comprises the step of selecting at least one of said predetermined number of data elements which most closely matches said degree of knowledge of said user.

19. A method of selecting and presenting to a user of personalized data elements out of the database stored on an Internet server, according to claim 1, further comprising the step of notifying said user in case of emergency.

20. A method of selecting and presenting to a user of personalized data elements out of the database stored on an Internet server, according to claim 1, wherein said personal information is about a body of said user; said step of selecting a segment further comprises calculating a body index of said user and selecting all data elements within said database with body indexes which closely match said body index of said user; and said step of selecting a predetermined number of said data elements from said selected segment further comprises the step of selecting at least one of said predetermined number of data elements whose predetermined criteria matches a predetermined criteria of said user.

21. A method of selecting and presenting to a user of personalized data elements out of the database stored on an Internet server, according to claim 20, wherein at least on of said predetermined criteria is a birthday of said user.

22. A method of selecting and presenting to a user of personalized data elements out of the database stored on an Internet server, according to claim 20, wherein at least one of said predetermined criteria is a zodiacal sign of said user.

23. A method of selecting and presenting to a user of personalized data elements out of the database stored on an Internet server, according to claim 1, wherein said personal information comprises information required for accurate presentation of a vision test on said user's screen; said step of selecting a segment further comprises selecting an appropriately scaled test chart; and said step of selecting a predetermined number of said data elements from said selected segment further comprises the step of selecting at least one of said predetermined number of data elements which approximately indicates sharpness of said user's vision.

24. An apparatus for selecting and presenting to a user of personalized data elements out of the database stored on an Internet server, comprising:
　　means for obtaining personal information from said user identifying topics of interest of said user;
　　means for storing said personal information on said Internet server as a personal user profile;
　　means for selecting a specific segment of said database which is to be searched for desired data elements;
　　means for selecting a predetermined number of said data elements from said selected segment of said database, ranked in accordance with said personal profile obtained from said user;
　　means for posting said selected database elements directly to a user's home page in ranked order for said user's view.

25. A method of selecting of personalized data elelments from all databases accessible on the Internet and presenting of said data elements to a user, comprising the steps of:
　　obtaining personal information from said user identifying topics of interest of said user;
　　storing said personal information on an Internet server as a personal user profile;
　　selecting a specific segment of said databases which is to be searched for desired data elements;
　　selecting a predetermined number of said data elements from said selected segment of said databases, ranked in accordance with said personal profile obtained from said user;
　　posting said selected database elements directly to a user's home page in ranked order for said user's view.

* * * * *